United States Patent
Boodman et al.

(10) Patent No.: US 11,030,187 B1
(45) Date of Patent: Jun. 8, 2021

(54) DISTRIBUTED DATABASE SYSTEMS AND STRUCTURES

(71) Applicant: salesforce.com, inc., San Francisco, CA (US)

(72) Inventors: Aaron Boodman, San Francisco, CA (US); Rafael Weinstein, San Francisco, CA (US); Erik Arvidsson, San Francisco, CA (US); Chris Masone, Petaluma, CA (US); Dan Willhite, San Francisco, CA (US); Benjamin Kalman, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 198 days.

(21) Appl. No.: 15/598,282

(22) Filed: May 17, 2017

Related U.S. Application Data

(60) Provisional application No. 62/338,434, filed on May 18, 2016.

(51) Int. Cl.
  *G06F 16/30* (2019.01)
  *G06F 16/23* (2019.01)
  *H04L 29/08* (2006.01)
  *G06F 16/28* (2019.01)
  *G06F 16/22* (2019.01)

(52) U.S. Cl.
  CPC ...... *G06F 16/2379* (2019.01); *G06F 16/2246* (2019.01); *G06F 16/235* (2019.01); *G06F 16/285* (2019.01); *H04L 67/1097* (2013.01)

(58) Field of Classification Search
  CPC .......... G06F 17/30153; G06F 16/1744; G06F 16/2379; G06F 16/258; G06F 16/2246; G06F 16/235

USPC ........ 707/609, 687, 705, 769, 790, 813, 821
See application file for complete search history.

(56) References Cited

U.S. PATENT DOCUMENTS

| | | | |
|---|---|---|---|
| 10,216,754 B1* | 2/2019 | Douglis | G06F 16/1744 |
| 2009/0013129 A1* | 1/2009 | Bondurant | G06F 3/0608 |
| | | | 711/115 |
| 2013/0276058 A1* | 10/2013 | Buldas | H04L 63/0876 |
| | | | 726/2 |
| 2015/0302021 A1* | 10/2015 | Gu | G06F 3/0613 |
| | | | 707/828 |

\* cited by examiner

*Primary Examiner* — Sana A Al-Hashemi
(74) *Attorney, Agent, or Firm* — Wong & Rees LLP; Karl T. Rees

(57) ABSTRACT

Systems and techniques are described for efficient, general-purpose, and potentially decentralized databases, distributed storage systems, version control systems, and/or other types of data repositories. Data is represented in a database system in such a way that any value is represented by a unique identifier which is derived from the value itself. Any database peer in the system will derive an identical identifier from the same logical value. The identifier for a value may be derived using a variety of mechanisms, including, without limitation, a hash function known to all peers in the system. The values may be organized hierarchically as a tree of nodes. Any two peers storing the same logical value will deterministically represent that value with a graph, such as the described "Prolly" tree, having the same topology and hash value, irrespective of possibly differing sequences of mutations which caused each to arrive at the same final value.

20 Claims, 12 Drawing Sheets

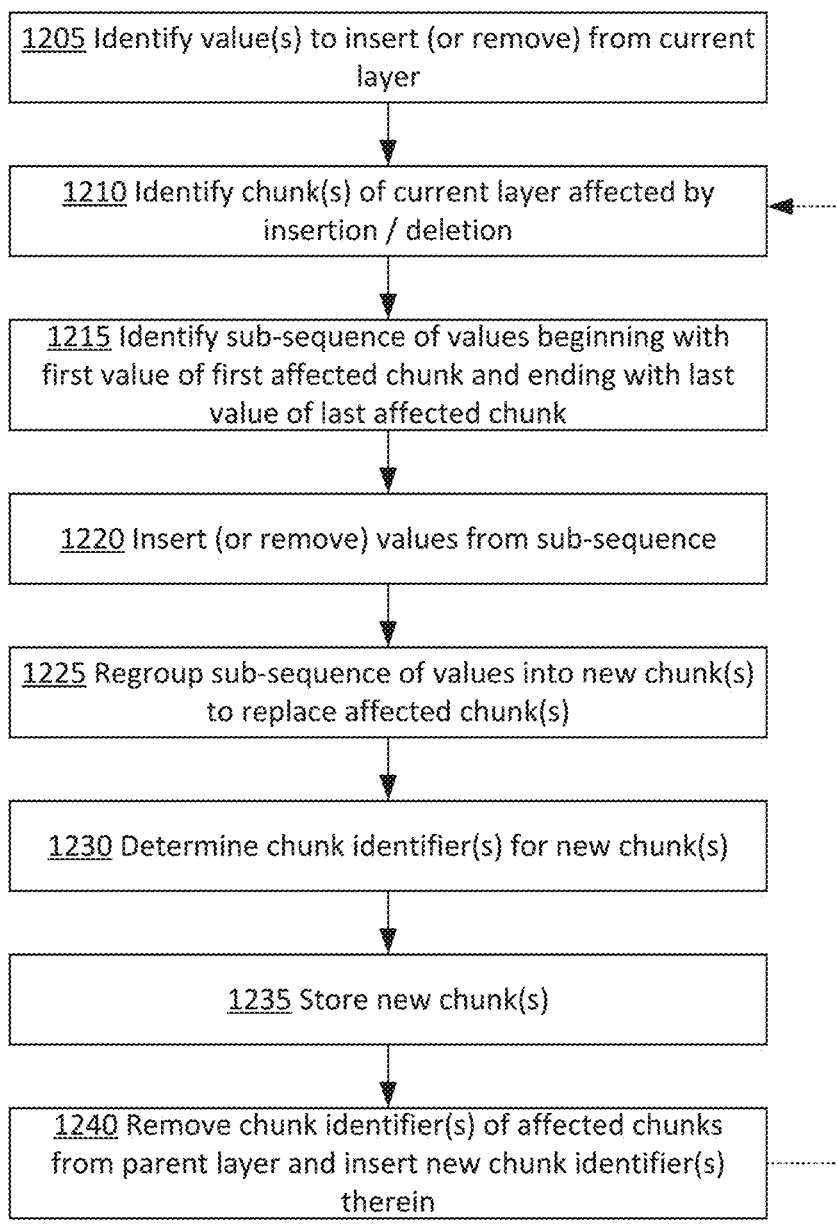

DISTRIBUTED DATABASE SYSTEMS AND STRUCTURES

PRIORITY CLAIM

This application claims benefit under 35 U.S.C. § 119(e) of Provisional Application No. 62/338,434, filed May 18, 2016, the entire contents of which is hereby incorporated by reference as if fully set forth herein.

TECHNICAL FIELD

Embodiments relate generally to electronic data management, and, more specifically, to techniques for storing and maintaining electronic data in distributed systems.

BACKGROUND

As the amount of data stored in databases increases exponentially and the velocity at which data is stored and retrieved increases, there is a constant need for databases with greater performance and availability. Some systems allow a set of peers to exist such that any peer can operate on an equivalent local representation of data and make changes without cooperation from any other peer. To share data updates, modified data sets may be reconciled at any time between database peers. Being fully decentralized, these systems tend to be insusceptible to contention over individual resources. However, these systems do not allow for the storage of structured data in a way which enables local read and write operations on the data to be comparable in performance to that of databases such as SQL, NoSQL, or NewSQL.

BRIEF DESCRIPTION OF THE DRAWINGS

The present inventions are illustrated by way of example, and not by way of limitation, in the figures of the accompanying drawings and in which like reference numerals refer to similar elements and in which:

FIG. 12 is a flow chart illustrating an example process flow for modifying a tree-like structure.

DETAILED DESCRIPTION

Figure 1:
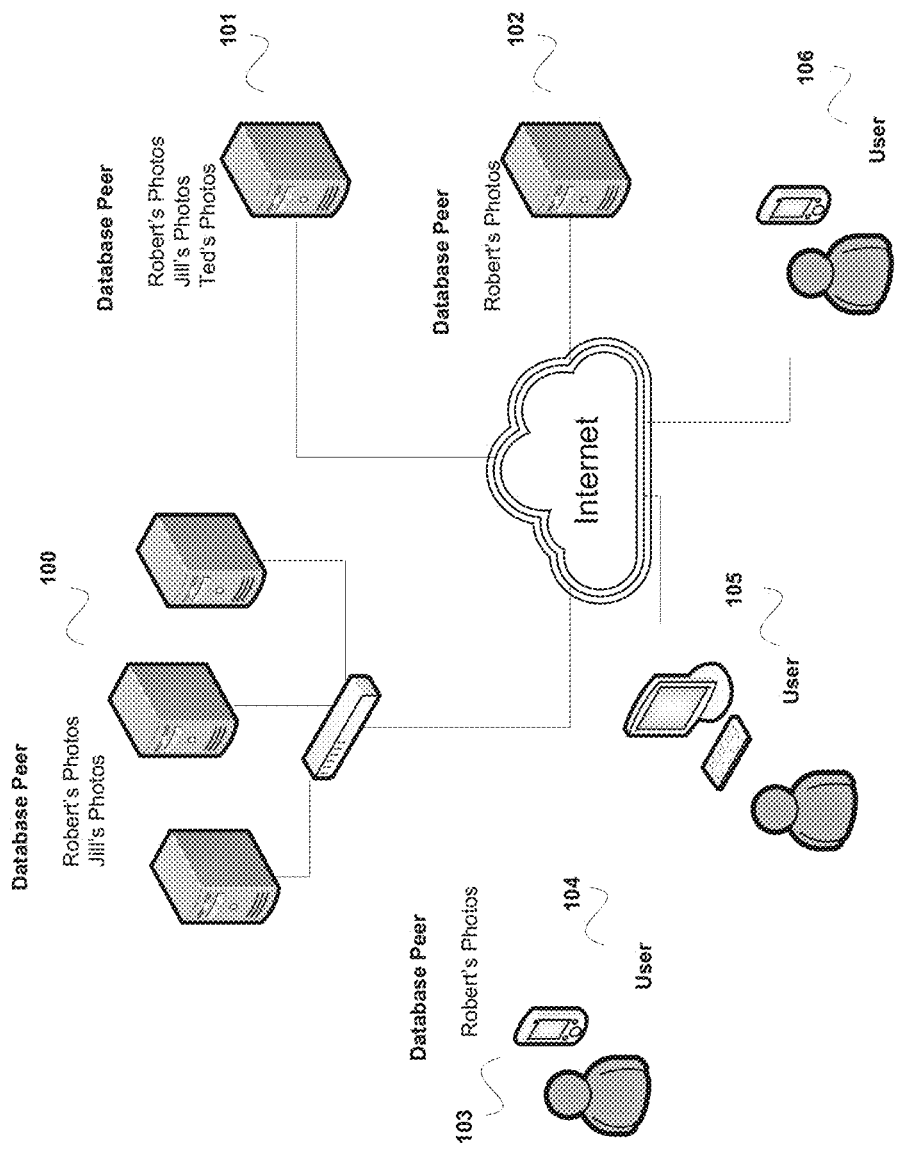
FIG. 1 illustrates an example distributed system in which described techniques may be implemented.

In the following description, for the purposes of explanation, numerous specific details are set forth in order to provide a thorough understanding of the present inventions. It will be apparent, however, that the present inventions may be practiced without these specific details. In other instances, well-known structures and devices are shown in block diagram form in order to avoid unnecessarily obscuring the present inventions.

Embodiments are described herein according to the following outline:
- 1.0. General Overview
- 2.0. Distributed Database Systems
- 3.0. B-Trees
- 4.0. Hash Functions
- 4.1. Rolling Hashes
- 5.0. System Overview
- 6.0. Data Model and Values
- 6.1. Unique Identifiers
- 6.2. Value Types
- 6.3. Chunks
- 7.0. Prolly Trees
- 8.0. Functional Overview—Tree Creation and Management
- 8.1. Example Tree Creation Flow
- 8.2. Example Chunking Flow
- 8.3. Example Tree Modification Flow
- 9.0. Versioning
- 10.0. Data Synchronization and Movement
- 10.1. Ref Height
- 10.2. Type Information
- 11.0. Access Control
- 12.0. Commit Validation
- 12.1. In Process Validity
- 12.2. Over the network validity
- 13.0. Miscellaneous
- 14.0. Example Embodiments
- 15.0. Implementation Mechanism—Hardware Overview
- 16.0. Extensions and Alternatives

1.0. GENERAL OVERVIEW

Among other aspects, the described systems and techniques allow for efficient, general-purpose, and potentially decentralized databases, distributed storage systems, version control systems, and/or other types of data repositories.

According to an embodiment, data is represented in a database system in such a way that any value is represented by a unique identifier which is derived from the value itself. Moreover, any database peer in the system will derive an identical identifier from the same logical value. Values in this system can be of arbitrary size and composed of sub-values, each of which retains the same basic property. The identifier for a value may be derived using a variety of mechanisms, including, without limitation, a hash function known to all peers in the system. In an embodiment, the values may be organized hierarchically as a tree of nodes, in which each node consequentially has a unique identifier.

According to an embodiment, a database system provides an efficient, decentralized database where any two peers storing the same logical value (where a value may be composed of an unlimited number of sub-values), will deterministically represent that value with a Merkle directed acyclic graph having the same topology and hash value, irrespective of possibly differing sequences of mutations which caused each to arrive at the same final value.

One challenge in retaining this property, especially for very large values, is choosing a method of structuring data such that queries and updates are efficient, but that the sequence of mutations which resulted in a given value do not affect the computation of the value's identifier.

According to an embodiment, efficient queries, updates, and ordered traversals of large datasets occur based on an underlying data structure comprised of a balanced search tree, where the tree structure is solely a function of the values encoded in the tree. A novel implementation of a tree, referred to herein as a "Prolly tree," is one example of a data structure suitable for use in representing data values of the described database systems. A Prolly tree has similar read, write and ordered traversal performance as that of a B-Tree, but its structure is probabilistic and dependent only on the data encoded in the tree.

The database adapts common search tree operations, such as operations adapted for searching B-Trees, for use with Prolly trees, which allows efficient queries and ordered traversal of large datasets, while simultaneously enabling peers in a decentralized system to operate without coordination and retain the ability to efficiently reason about differences in state when required, for example during synchronization, streaming of transformations or reconciling divergent changes. In at least one embodiment, a Prolly tree has query performance similar to B-Trees used by many SQL and NoSQL databases.

Traditional methods of retrieving, querying, and scanning ranges of values in a search tree may be applied directly to Prolly trees. Unlike a B-Tree and related structures, which have upper and lower bounds on the number of values in a tree-node and employ "rotations" to maintain balance, Prolly trees have a probabilistic average number of values in each tree-node and are balanced by logically reconstructing the entire tree from the full set of contained values, using previous states of the tree in order to reduce the number of I/O operations required to generate the new tree.

In an embodiment, data modeled within a peer's storage is represented deterministically by a Prolly tree data graph whose encoding and topology is dependent only on the logical values stored in the data—explicitly not dependent on the sequence of actions which resulted in the current set of values. Among other aspects, modeling state in such a graph, provides a convenient mechanism for computation of the afore-mentioned unique identifiers (e.g. a compact sequence of bytes referred to as a "hash value"), which can be exchanged with other peers in order to rapidly reason about exact differences in state.

It will be recognized that, beyond the advantageous applications of Prolly trees when used with the described database systems, there are a variety of applications for Prolly trees which derive benefits independent from the described database systems. Similarly, the described database systems may, in some embodiments, be utilized independently of Prolly trees.

In other aspects, the inventions encompass methods, computer apparatuses, and computer-readable media configured to carry out the foregoing techniques.

2.0. DISTRIBUTED DATABASE SYSTEMS

Databases may have requirements to allow updates and queries over the Internet while ensuring low latency access from any location in the world. To support low latencies, databases may be required to be physically located and replicated at multiple locations in multiple countries close to end users. Replication may also be required to ensure fault-tolerance, if one location or set of locations fails, other locations may be required to continue operating.

Traditional Structured Query Language (SQL) databases have long been used to store and retrieve data and utilize indexing to enable efficient access to such data. These databases operate under a set of properties; Atomicity, Consistency, Isolation and Durability (referred to by the acronym ACID), that guarantee database transactions are reliable and consistent.

If a database client updates data in a transaction, the update will happen reliably such that, when the transaction commits, any other client querying the database will get the updated value and not the previous value or a value representing the transaction in a partially committed state.

Additionally, if the database data itself is replicated, partitioned or sharded across multiple physical machines, transactions will still occur in a consistent and reliable fashion. Database software on multiple machines may operate in a master/slave fashion, a multi-master fashion or replicated fashion to balance load and ensure reliability in case a set of machines or storage devices fail. Some current examples of traditional SQL database are: Oracle's database, Oracle's MySQL database, PostgreSQL, IBM's DB2, SQLite, Ingres, Microsoft Access and the Microsoft SQL Server database.

Certain traditional SQL databases emphasize consistency over availability and fault tolerance. To ensure data consistency, if a subset of physical machines in the database lose the ability to communicate with another set, attempts to modify data may fail as updating the data on only a subset of machines may leave the system in an inconsistent state. Additionally, there exists contention for resources when multiple database clients are attempting to modify the same data or when data is queried while in the midst of being modified since, in relational SQL databases, data is modeled as a "single source of truth" where data elements are stored once (in a single row, in a single table) and then referred to via linkages in other rows in other tables.

As the requirements for higher speed and wider distribution have increased along with data size and number of users, there has been a movement from Structure Query Language based (SQL based) Relational Database Management Systems (RDBMS) to NoSQL (Not Only SQL) databases for data types that do not need the ACID properties of SQL databases and where an emphasis on speed, availability and fault-tolerance is desired over complete consistency.

In contrast to the somewhat homogeneous nature of SQL databases, NoSQL databases take on a variety of forms, from hashed-based key-value data stores to column stores to graph-based databases and document databases. Many have properties that give them higher performance and better efficiency than the alternative, especially when database nodes are distributed in multiple locations. The term "NoSQL" was first used in the late 1990's and it is a catch-all term for all databases that are not traditional RDBMS systems. The term has no specific, universally accepted definition.

In contrast with RDBMSs, NoSQL databases tend to guarantee nodes remain available for querying and updating even if they are unable to communicate with each other. NoSQL databases tend to operate under the properties of: Basically Available, Soft State, Eventual Consistency (referred to by the acronym BASE). A database operating under BASE properties tends to be distributed and consistency of data is traded in favor of speed and availability. When individual machines lose the ability to communicate with each other, there may be no guarantee that all database nodes (machines) have the exact same data. In this inconsistent state, queries to one database node may return different values than queries to another database node.

A database with BASE properties generally works by converging to a single source of truth instead of maintaining an always consistent single source of truth. To maintain data consistency over time, NoSQL databases tend to offer the ability to synchronize differences between nodes when necessary. Operating in this fashion, NoSQL databases favor speed and availability over immediate consistency and, because of that, whether one uses a RDBMS or a NoSQL database to manage a given set of data depends on the requirements for speed and availability versus consistency with respect to that data set. Many large software applications utilize a combination of SQL and NoSQL databases. Some current examples of NoSQL database are: MongoDB, Cassandra, Redis, HBase, Neo4j, Couchbase, CouchDB and Amazon's DynamoDB.

Attempts have been made to realize the benefits of increased availability and fault tolerance of NoSQL while maintaining many of the benefits of SQL. Databases that attempt to form a balance between the two and bring the relational SQL model to NoSQL databases fall under the heading of "NewSQL" databases. NewSQL databases are relatively recent, the term itself was first used in 2011 Like SQL databases, these databases have contention over a single resource and maintain a single source of truth that is updated to maintain data consistency. Some current examples of NewSQL databases are: VoltDB, Clustrix, NuoDB and Google Spanner.

Conventional SQL, NoSQL and NewSQL databases allow storage of structured data that allows for highly efficient queries and updates. However, users of such systems depend upon convergence or contact with a single source of truth in order to logically move state forward. In parallel with the development of NoSQL databases, there have been advances in version control system software, file system software and other types of data storage that operate in a fundamentally different fashion than most databases and which do not employ a single source of truth to logically move state forward.

A number of fully decentralized systems, that are not general purpose databases but which are used to store specific data types, have been developed to get around resource contention and availability issues present in centralized and semi-centralized systems. These fully decentralized systems tend to use Merkle directed acyclic graphs, as some NoSQL databases such as Cassandra and Riak do, to quickly resolve differences between discrete data sets. Some representative examples of these systems include: the BitTorrent peer-to-peer file sharing system, the bitcoin blockchain and Ethereum blockchain systems, the Git distributed revision control system, and the InterPlanetary File System.

The BitTorrent system is one example of a fully decentralized system. In the BitTorrent system, a torrent file that contains metadata about files and folders to be distributed is distributed and downloaded by a client. The torrent file may contain a list of trackers, which are computers that aid in distributing files comprising the file data desired. A peer-to-peer network of computers exists to distribute files with computers forming distribution groups called swarms. The metadata in the torrent file contains a cryptographic digest of every piece of content, allowing individual pieces of files to be verified during the download process. Unlike many other decentralized systems, BitTorrent uses hashes to verify content but does not use a Merkle tree to represent either metadata or data sets themselves, although there are extensions to BitTorrent that do.

Another technology that is not a general purpose database but that utilizes a decentralized data store of specific data types is a blockchain. A blockchain has a natural directed acyclic graph structure where each block contains a list of transaction objects, a link to the previous block and a hash of a state tree. The most well-known system that implements a blockchain to track transactions is the bitcoin system. Another representative blockchain based scheme, the Ethereum system, is implemented utilizing a blockchain data store in the form of a Merkle tree. More specifically, it utilizes a radix tree where values are encoded in the path taken when traversing down the tree and with Merkle hash values affixed to tree nodes. This mixed radix/Merkle tree structure is identified as a Merkle-Patricia tree.

A Merkle-Patricia tree enables efficient querying, updating, and ordered traversal of large datasets, provided that the dataset has keys that are well-distributed over the keyspace. If the keys are not well-distributed, then queries, updates, and ordered-traversal will not be efficient. To combat this, it is common to hash the keys used in Merkle-Patricia trees. This makes queries and updates efficient with keys that are poorly distributed, but makes ordered traversal inefficient.

The Git distributed revision control system is an example of a fully decentralized storage system. Git development started in 2005 and can be conceptually thought of as a specialized NoSQL database supporting a very limited set of basic types. Git allows the creation and sharing of data sets that consist of source code and related elements. Individual developers may run their own Git server, maintain their own copies of software source code and/or may utilize a shared Git server such as the ones provided by GitHub. GitHub is a cloud based (Internet based) Git repository host service that operates Git servers. A developer that makes changes to source code locally may synchronize those changes with a shared Git server to share code changes with other developers.

In Git, special purpose database peers move forward independently and maintain a full copy of the data set they are interested in. When changes to the data are made and the changes need to be merged or shared with another peer, the Merkle graphs of repository file sets are compared to quickly determine which files have changed and a standard "diff" comparison is used to resolve disparities between the contents of files. Git, however, is not a general purpose database. Arbitrary data may be stored in it, such as images, HTML files, sound files and the like, but they are stored as one of 4 basic types: blob, tree, commit or tag. The Git system does not support a variety of typed and structured data in the way a general purpose database does.

Because Git is fully decentralized, it is highly available and resource contention is avoided because any peer can operate on an equivalent local representation of data and make changes without cooperation from any other peer.

Following the popularity of Git, a system named the InterPlanetary File System or IPFS was created in 2014 and modeled on the same fully decentralized architecture as Git. IPFS provides a content-addressable block storage model along with content-addressed hyperlinks to form a Merkle directed acyclic graph to represent stored data sets. IPFS was designed in such a way that it has no single point of failure and where the fully decentralized file system peers do not need to trust each other. The IPFS file system stores object data using 2 fields: a blob of data and an array of link structures. A link, in turn, has 3 fields: a name, a hash value and the size of the linked object. IPFS supports storing both structured and unstructured data. However, unlike a general-purpose database, IPFS does not support efficient queries, updates, and ordered traversal of that data.

Other Merkle directed acyclic graph based systems that are fully decentralized but which are not general purpose databases include: the ZFS file system and the Tahoe-LAFS backup system.

3.0. B-TREES

A B-tree is a self-balancing tree data structure that keeps data sorted and allows searches, sequential access, insertions, and deletions in logarithmic time. In B-trees, internal (non-leaf) nodes can have a variable number of child nodes within some pre-defined range. When data is inserted or removed from a node, its number of child nodes changes. In order to maintain the pre-defined range, internal nodes may be joined or split. Because a range of child nodes is permitted, B-trees do not need re-balancing as frequently as other self-balancing search trees, but may waste some space, since nodes are not entirely full. The lower and upper bounds on the number of child nodes are typically fixed for a particular implementation. For example, in a 2-3 B-tree (often simply referred to as a 2-3 tree), each internal node may have only 2 or 3 child nodes.

Each internal node of a B-tree will contain a number of keys. The keys act as separation values which divide its subtrees. For example, if an internal node has 3 child nodes (or subtrees) then it must have 2 keys: a1 and a2. All values in the leftmost subtree will be less than a1, all values in the middle subtree will be between a1 and a2, and all values in the rightmost subtree will be greater than a2.

Usually, the number of keys is chosen to vary between d and 2d, where d is the minimum number of keys, and d+1 is the minimum degree or branching factor of the tree. In practice, the keys take up the most space in a node. The factor of 2 will guarantee that nodes can be split or combined. If an internal node has 2d keys, then adding a key to that node can be accomplished by splitting the 2d key node into two d key nodes and adding the key to the parent node. Each split node has the required minimum number of keys. Similarly, if an internal node and its neighbor each have d keys, then a key may be deleted from the internal node by combining with its neighbor. Deleting the key would make the internal node have d−1 keys; joining the neighbor would add d keys plus one more key brought down from the neighbor's parent. The result is an entirely full node of 2d keys.

The number of branches (or child nodes) from a node will be one more than the number of keys stored in the node. In a 2-3 B-tree, the internal nodes will store either one key (with two child nodes) or two keys (with three child nodes). A B-tree is sometimes described with the parameters (d+1)-(2d+1) or simply with the highest branching order, (2d+1).

A B-tree is kept balanced by requiring that all leaf nodes be at the same depth. This depth will increase slowly as elements are added to the tree, but an increase in the overall depth is infrequent, and results in all leaf nodes being one more node farther away from the root.

B-trees have substantial advantages over alternative implementations when the time to access the data of a node greatly exceeds the time spent processing that data, because then the cost of accessing the node may be amortized over multiple operations within the node. This usually occurs when the node data are in secondary storage such as disk drives. By maximizing the number of keys within each internal node, the height of the tree decreases and the number of expensive node accesses is reduced. In addition, rebalancing of the tree occurs less often. The maximum number of child nodes depends on the information that must be stored for each child node and the size of a full disk block or an analogous size in secondary storage. While 2-3 B-trees are easier to explain, practical B-trees using secondary storage need a large number of child nodes to improve performance.

According to one definition, a B-tree of order m is a tree which satisfies the following properties:
Every node has at most m children.
Every non-leaf node (except root) has at least ⌈m/2⌉ children.
The root has at least two children if it is not a leaf node.
A non-leaf node with k children contains k−1 keys.
All leaves appear in the same level
Each internal node's keys act as separation values which divide its subtrees. For example, if an internal node has 3 child nodes (or subtrees) then it must have 2 keys: a1 and a2. All values in the leftmost subtree will be less than a1, all values in the middle subtree will be between a1 and a2, and all values in the rightmost subtree will be greater than a2.

Internal nodes: Internal nodes are all nodes except for leaf nodes and the root node. They are usually represented as an ordered set of elements and child pointers. Every internal node contains a maximum of U children and a minimum of L children. Thus, the number of elements is always 1 less than the number of child pointers (the number of elements is between L−1 and U−1). U must be either 2L or 2L−1; therefore each internal node is at least half full. The relationship between U and L implies that two half-full nodes can be joined to make a legal node, and one full node can be split into two legal nodes (if there's room to push one element up into the parent). These properties make it possible to delete and insert new values into a B-tree and adjust the tree to preserve the B-tree properties.

The root node: The root node's number of children has the same upper limit as internal nodes, but has no lower limit. For example, when there are fewer than L-1 elements in the entire tree, the root will be the only node in the tree with no children at all.

Leaf nodes: Leaf nodes have the same restriction on the number of elements, but have no children, and no child pointers.

4.0. HASH FUNCTIONS

A hash function is any function that can be used to map data of arbitrary size to data of fixed size. The values returned by a hash function are called hash values, hash codes, hash sums, or simply hashes.

A hash procedure must be deterministic—meaning that for a given input value it must always generate the same hash value. In other words, it must be a function of the data to be hashed, in the mathematical sense of the term. This requirement excludes hash functions that depend on external variable parameters, such as pseudo-random number generators or the time of day. It also excludes functions that depend on the memory address of the object being hashed in cases that the address may change during execution (as may happen on systems that use certain methods of garbage collection), although sometimes rehashing of the item is possible. The determinism is in the context of the reuse of the function.

A good hash function may map the expected inputs as evenly as possible over its output range. That is, every hash value in the output range should be generated with roughly the same probability. The reason for this last requirement is that the cost of hashing-based methods goes up sharply as the number of collisions—pairs of inputs that are mapped to the same hash value—increases. If some hash values are more likely to occur than others, a larger fraction of the lookup operations will have to search through a larger set of colliding table entries.

Note that this criterion only requires the value to be uniformly distributed, not random in any sense. A good randomizing function is (barring computational efficiency concerns) generally a good choice as a hash function, but the converse need not be true.

In other words, if a typical set of m records is hashed to n table slots, the probability of a bucket receiving many more than m/n records should be vanishingly small. In particular, if m is less than n, very few buckets should have more than one or two records.

It is often desirable that the output of a hash function have fixed size. Producing fixed-length output from variable length input can be accomplished by breaking the input data into chunks of specific size. In cryptographic applications, hash functions are typically expected to be practically non-invertible, meaning that it is not realistic to reconstruct the input datum x from its hash value h(x) alone without spending great amounts of computing time (e.g. a One-way function).

If the datum to be hashed is small enough, one can use the datum itself (reinterpreted as an integer) as the hashed value. The cost of computing this "trivial" (identity) hash function is effectively zero. This hash function is perfect, as it maps each input to a distinct hash value. Other types of data can also use this perfect hashing scheme. For example, when mapping character strings between upper and lower case, one can use the binary encoding of each character, interpreted as an integer, to index a table that gives the alternative form of that character ("A" for "a", "8" for "8", etc.). If each character is stored in 8 bits (as in ASCII or ISO Latin 1), the table has only 28=256 entries; in the case of Unicode characters, the table would have 17×216=1114112 entries. The same technique can be used to map two-letter country codes like "us" or "za" to country names (262=676 table entries), 5-digit zip codes like 13083 to city names (100000 entries), etc. Invalid data values (such as the country code "xx" or the zip code 00000) may be left undefined in the table, or mapped to some appropriate "null" value.

A hash function that is injective—that is, maps each valid input to a different hash value—is said to be perfect. With such a function one can directly locate the desired entry in a hash table, without any additional searching. If the inputs are bounded-length strings and each input may independently occur with uniform probability (such as telephone numbers, car license plates, invoice numbers, etc.), then a hash function needs to map roughly the same number of inputs to each hash value. For instance, suppose that each input is an integer z in the range 0 to N−1, and the output must be an integer h in the range 0 to n−1, where N is much larger than n. Then the hash function may be h=z mod n (the remainder of z divided by n), or h=(z×n)÷N (the value z scaled down by n/N and truncated to an integer), or many other formulas.

When the data values are long (or variable-length) character strings—such as personal names, web page addresses, or mail messages—their distribution is usually very uneven, with complicated dependencies. For example, text in any natural language has highly non-uniform distributions of characters, and character pairs, very characteristic of the language. For such data, it is prudent to use a hash function that depends on all characters of the string—and depends on each character in a different way. In cryptographic hash functions, for example, a Merkle-Damgård construction is usually used. In general, the scheme for hashing such data is to break the input into a sequence of small units (bits, bytes, words, etc.) and combine all the units b[1], b[2], . . . , b[m] sequentially.

A hash value can be used to uniquely identify information. When used in this manner, it is often desirable that the hash function is collision-resistant, which means that it is very hard to find data that generate the same hash value. Collision resistance is accomplished in part by generating very large hash values. For example, SHA-1, one of the most widely used cryptographic hash functions, generates 160 bit values.

Although example hash functions are described herein, the described techniques do not require the use of hash functions with any specific properties, unless inherent or otherwise noted.

4.1. Rolling Hashes

A rolling hash (also known as recursive hashing or rolling checksum) is a hash function where the input is hashed in a window that moves through the input.

A few hash functions allow a rolling hash to be computed very quickly—the new hash value is rapidly calculated given only the old hash value, the old value removed from the window, and the new value added to the window—similar to the way a moving average function can be computed much more quickly than other low-pass filters.

One popular rolling hash algorithm is known as the Rabin-Karp algorithm, which uses the rolling hash described below. Another popular application is rsync program which uses a checksum based on adler-32 as its rolling hash. Another application is the Low Bandwidth Network Filesystem (LBFS), which uses a Rabin fingerprint as its rolling hash.

The Rabin-Karp string search algorithm is normally used with a very simple rolling hash function that only uses multiplications and additions:

$H=c_1*a\^{k-1}+c_2*a\^{k-2}+c_3*a\^{k-3}+ \ldots +c_k*a\^{0}$ where a is a constant and $c_1, \ldots, c_k$ are the input characters.

In order to avoid manipulating huge H values, all math may be performed modulo n. The choice of a and n is critical to achieve good hashing; see linear congruential generator for more discussion.

Removing and adding characters simply involves adding or subtracting the first or last term. Shifting all characters by one position to the left requires multiplying the entire sum H by a. Shifting all characters by one position to the right requires dividing the entire sum H by a. Note that in modulo arithmetic, a can be chosen to have a multiplicative inverse $a\^{-1}$ by which H can be multiplied to get the result of the division without actually performing a division.

One of the interesting use cases of the rolling hash function is that it can create dynamic, content-based chunks of a stream or file. This is especially useful when it is required to send only the changed chunks of a large file over a network and a simple byte addition at the front of the file would cause all the fixed size windows to become updated, while in reality, only the first 'chunk' has been modified.

The simplest approach to calculate the dynamic chunks is to calculate the rolling hash, and, when the rolling hash matches a pattern (e.g. the lower N bits are all zeroes) then a chunk boundary is generated. This approach will ensure that any change in the file will only affect its current and possibly a limited number of subsequent chunks, but nothing else.

When the boundaries are known, the chunks need to be compared by their hash values to detect which one was modified and needs transfer across the network.

Hashing by cyclic polynomial—sometimes called Buzhash—is also simple, but it has the benefit of avoiding multiplications, using barrel shifts instead. It is a form of tabulation hashing. Several applications perform content-based slicing based on a specific (unweighted) moving sum.

The described techniques are not necessarily limited to any specific type of rolling hash function.

5.0. SYSTEM OVERVIEW

FIG. 1 is an illustrative view of various aspects of an example system 100 in which the techniques described herein may be practiced, according to an embodiment. System 100 comprises one or more computing devices. These one or more computing devices comprise any combination of hardware and software configured to implement the various logical components described herein. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

An efficient, decentralized database is described. In an embodiment, a computer network with a number of database peers is implemented as illustrated in FIG. 1, where the example system contains 4 database peers. Peer 100 has database software running on three physical computers connected to the Internet. Peers 101 and 102 have database server software running on single computers connected to the Internet. Peer 103 is a database peer running on a smartphone not connected to any network. The database software may be running on bare hardware, in virtual machines, or in containers on the physical computers.

The embodiment shown in FIG. 1 shows 3 sets of photo data stored across the full set or subset of 4 database peers. All 3 photo databases, Robert's, Jill's and Ted's, are present on peer 101. A subset of the photo databases, Robert and Jill's photo data, is present on peer 100. Only Robert's photo data is present on peer 102 and peer 103.

In this manner, all peers have a copy of Robert's photo data allowing the computer used by user 105 or the smartphone used by user 106 to contact any Internet connected peer to obtain Robert's photo data. User 104 may access Robert's photo data from the database peer containing the dataset on their smartphone. The other photo datasets are only available from a subset of peers; user 105 cannot contact peer 102 to access Jill's photos, for example.

The database peers in this illustration are fully decentralized. If user 105 accesses peer 100 and adds a new photo to the Robert's photo data set, that photo is not automatically replicated to any other database peer. After the photo addition, if user 106 accesses Robert's photos on peer 102, the user would not see the new photo in the dataset. Robert's photo data sets on peer 100, 101, 102 and 103 would need to be merged to incorporate any additions to the data sets on any of the peers for the new photo to be available on peers other than peer 100. This merging happens on an as-needed basis and its timing is determined completely by the application managing the data sets.

This example shows Robert's photo data replicated across a number of peers, allowing client requests to be distributed among those peers to decrease load on individual peers. For internet connected peers, any global and/or local (server) load balancing techniques may be used to distribute database requests among the peers including such techniques as DNS IP load balancing, DNS anycast, virtual IP addressing, using layer 3 through 7 load balancing switches, HTTP redirect load balancing or IPv6 flow label load balancing. Database peer software may be bundled with web browsers or combined with them, allowing users to have a database peer on their local machine without having to install software separately.

Queries and updates are made to peers using hashes to identify datasets. The hash identifies the state of the dataset and corresponding tree at a point in time. When the data set is updated, a new hash is created by the peer to identify the updated data set that describes the updated tree at a new point in time. The hash value that identified the data set previous to the update continues to be valid after the update and creation of the new hash and clients may access a peer to access data sets at previous points in time.

The embodiment illustrated in FIG. 1 shows the peer and client computers connected to each other via the Internet. However, this is just a representative network—an intranet, an extranet, or any other network may be used to connect the computers. Additionally, the database peer software may run on an individual computer not connected to any network and client software on that machine may communicate with the database peer running on the unconnected computer, itself.

6.0. DATA MODEL AND VALUES

According to an embodiment, in a database peer, a dataset of values is modeled and stored as a collection of value-encoding nodes, organized in a tree-like data structure, such as a Merkle directed-acyclic graph or other directed graph of nodes. Each node corresponds to a separate value, which may be, for example, a primitive value, a reference to a unit of storage that stores a set of one or more values, a complex value composed of multiple primitive values and/or references, and so forth. The "child-parent" relationships of the tree are formed by the references, with the node that contains the reference being the "parent" node, and each discrete value in the referenced unit of storage being a "child" node that descends from the parent node. The value of a child node is itself a sub-value of the value of the parent node from which the child node descends. Thus, the entire tree itself, and each subtree thereof, may be said to correspond to a separate value.

6.1. Unique Identifiers

A unique identifier, such as a hash value, may be assigned to each value. The unique identifier is derived from the value encoded in the node and, transitively, from the values encoded in all nodes which are reachable (e.g. "descend") from that node in the tree-like data structure. The mechanism utilized to derive the unique identifier of a value may be referred to as the identifier-derivation function. For simplification, examples given throughout the remainder of this Specification will assume embodiments in which identifier-derivation function is a hash function applied against the value encoded in the node (or a serialized representation of that value, such as the series of bytes that encodes the value). However, it will be understood that in other embodiments, other identifier-derivation functions may be utilized in place of a hash function.

Moreover, when the identifier-derivation function is a hash function, any hash function of a node's encoded value may be utilized to generate a hash value for the node, though it will be recognized that certain types of hash functions produce more optimal results. In an embodiment, suitable hash functions include, without limitation, a cryptographic hash function such as Secure Hash Algorithm 1 (SHA-1), Secure Hash Algorithm 2 (SHA-2), and Secure Hash Algorithm 3. For example, SHA-1 may be suitable in embodiments with up to about 2^80 unique values and relatively little need to deal with malicious attacks, while in other embodiments, SHA-2 or other hashes would allow for greater numbers of unique values with some tradeoffs in terms of performance.

When two nodes have the same hash, it can be assumed that they represent identical logical values, and the respective subgraph of nodes reachable from each of the two nodes are topologically equivalent. This allows for efficient operations such as computing and reconciling differences and synchronizing state.

6.2. Value Types

A database peer may model any logical value as a directed-acyclic graph that has exactly one root node, zero or more descendent nodes, and exactly one corresponding hash value, which is deterministically derived from the data of the value itself.

A model of the database data is stored in a database peer either on a single physical machine or across multiple logical and/or physical machines. The stored database data consists of sets of values. Some example values are shown in FIG. 2.

Figure 2:
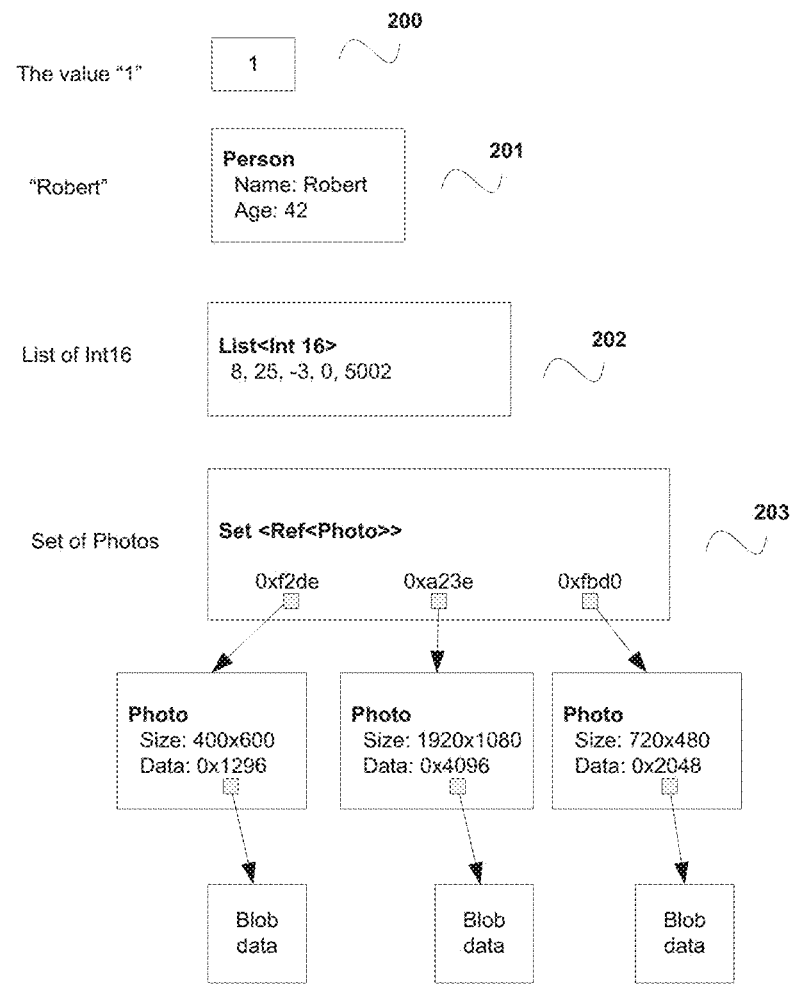
FIG. 2 illustrates a sampling of different value types.

One simple type of value, labeled 200 in FIG. 2, is an Integer numeric value that contains the value "1". Another type of value is a structural value set that contains multiple individual values. The Person structural value 201 contains the name of a person and their age. Value 202 is comprised of a list of individual values, in this case a list of 16-bit integer values. Finally, value 203 is comprised of a set of data, in this case a tree representing a set of photos. This value type is an example of one that may be used as a basis for the photo datasets for the example system presented in FIG. 1.

Other types of values that may be stored include, without limitation:

Primitives: (U)Int(8|16|32|64), Float(32|64), Boolean, String
(Binary) Blobs
User-defined Structs
Collections: Set<T>, Map<K, V>, List<T>
References: Ref<T>

Additionally, parameterized and composite types may be supported by a database peer, including, without limitation, types such as:

List<String>
Map<Int8, Set<Float64>>
Ref<Person>
List<Map<Ref<Set<Int16>>, Blob>

Other types, either basic or complex, may also be supported in addition to these example types.

6.3. Chunks

According to an embodiment, values are stored using storage unit structures referred to herein as chunks. A chunk may store values for one or more nodes at a same depth within the tree-like structure. Given that the value of a node may itself be a sub-value of another value, it can thus also be said that a value may be stored in one or more chunks. Each chunk is also assigned a unique identifier by applying the identifier-derivation function to the set of values stored therein. A chunk may thus also be conceptualized as a complex value in and of itself.

In an embodiment, chunks may be addressed (e.g. for storage and retrieval) in the database peer's persistence layer by the unique identifier (e.g. hash) of the logical value that they encode. For example, using a content addressing approach such as found in systems such as git, the unique identifier may be utilized as a Key for locating the chunk in a Key/Value store.

Thus, one way in which a node may reference a unit of storage that stores its descendant child node(s) is by the unique identifier of a chunk that stores the child node(s). That is, child nodes of a parent node may be stored in a chunk whose address/unique identifier is contained within the value of the parent node. An implication of the value of the parent node containing the unique identifier of the chunk in which its child nodes are stored is that the unique identifier of the parent node is, in turn, a function of the unique identifier (and hence values) of its children nodes.

Chunk boundaries are created explicitly via the Ref type, in that sub-values of a structure that are included in the structure via reference will be stored in a separate chunk than sub-values that are included inline within the structure. For instance, consider the following structure types:

Struct Bar 155
I: Int64
}
Struct Foo {
B: Bar
}

The Bar value which is describe by field B will be encoded inline within any value of Type Foo, and hence the value of Foo will be stored within a single chunk. Now, consider the following modification to the structure of Foo:

Struct Foo {
B: RekBar>
}

In this case any value of type Foo will have a field B which is a reference to a Bar value. In this case, the system ensures that the Bar value referenced by the field B within any given Foo value will be encoded in a separate chunk referenced by the Foo value rather than within the same chunk as the referencing Foo value. This also means that the chunk that stores the Bar value may be referenced by any other value, as well, and that the value of Bar may be directly fetched from the data store via its unique identifier (e.g. hash).

For types which may be large (e.g. Binary Blobs, Lists, Maps, Sets, etc.), the system may automatically break values of these types into chunks implicitly.

Figure 3:
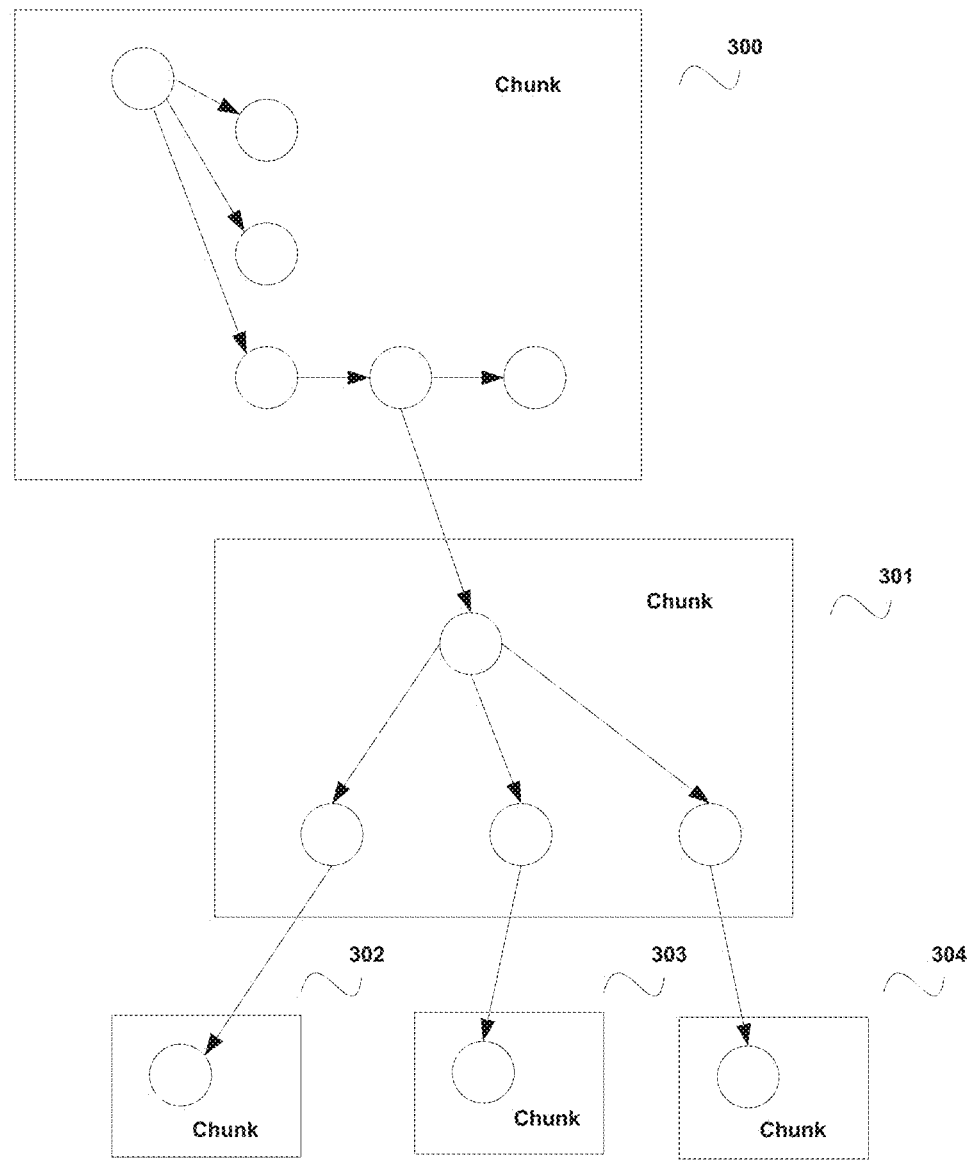
FIG. 3 illustrates an example of chunked values.

FIG. 3 shows a data tree broken into 5 chunks of data for storage, according to an embodiment. Chunks 302, 303 and 304 contain individual tree nodes and corresponding single values. Chunks 300 and 301 contain entire subtrees. Every chunk encodes a single logical value. A single logical value may be a component of another logical value represented by another chunk, and/or be composed of sub-values represented by other chunks.

According to some embodiments, the same logical value will be represented by the same graph, having the same chunk boundaries, regardless of what sequence of logical mutations resulted in the present value. Such embodiments rule out the use of classical B-Trees, because a B-Tree's internal state depends upon its mutation history. In some embodiments, in order to model large mutable collections, where B-Trees would typically be used, a novel data structure, termed a Prolly tree, may be used instead. However, in other embodiments, the database systems described herein may utilize any other data structure that represents the same value by the same graph, having the same chunk boundaries, regardless of what sequence of logical mutations resulted in the value.

7.0. PROLLY TREES

According to some embodiments, a data structure referred to herein as a Prolly tree may be utilized for a variety of purposes, including storage of data values within a distributed database system. A Prolly tree is a search tree where the average number of child nodes (i.e. sub-values) for each node is probabilistic rather than confined to strict bounds, with the actual number of children in a given node being determined algorithmically based on the data which is stored in the tree. Leaf nodes store primitive or other logical values, and internal nodes store references to child nodes and metadata about referenced subtrees.

A Prolly tree is similar in many ways to a B-Tree. However, the number of children in each internal node has a probabilistic average rather than an enforced upper and lower bound. Moreover, the set of children in a given internal node is determined based on the output of a rolling hash function over a specific sequence of the values encoded in the child nodes.

Figure 4:
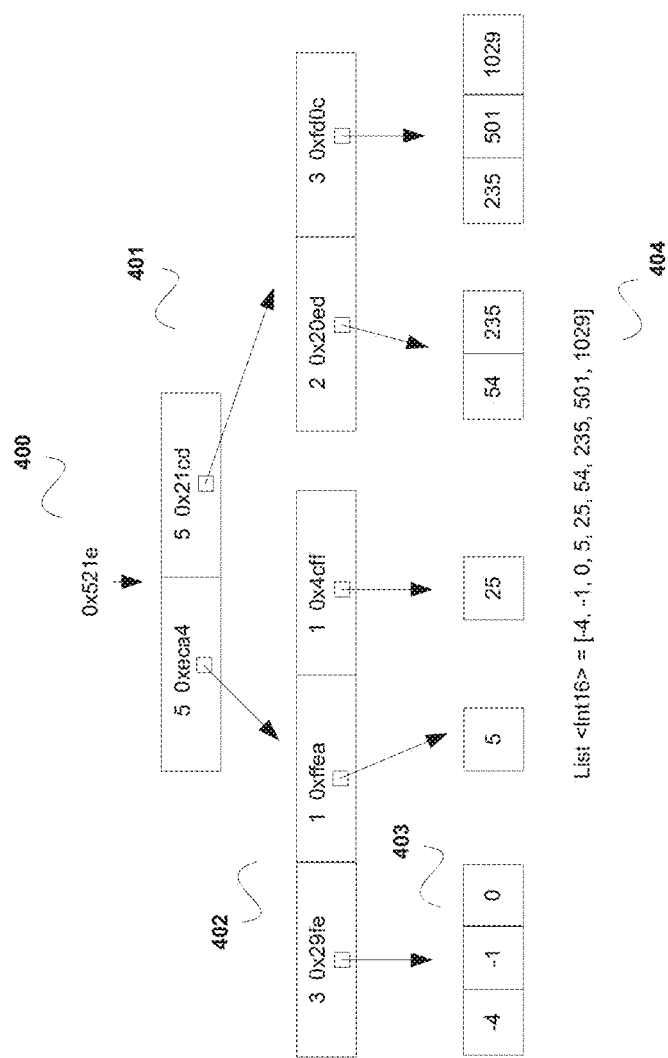
FIG. 4 illustrates an example Prolly tree.

FIG. 4 illustrates a representative Prolly tree. The tree identifies a list of 10 16-bit Integer values, arranged in a specific sequence, such as by ascending value or by the order in which the values were inserted into the list. The values in the list 404, in combination with a pre-defined chunking algorithm (such as a rolling hash function), fully determine the structure of the tree. The root 400 of the tree, having an illustrative hash value of 0x521e, uniquely identifies the set of values in the encoded in the tree. The root contains a probabilistic number of child nodes 401, in this case 2. This node, in turn, has a probabilistic number of child nodes, with 3 nodes 402 on the left and 2 on the right. The leaf nodes contain a probabilistic number of values. Leaf node 403, for example, contains 3 values.

In order for a collection of values to result in a deterministic structure, the values are first ordered in some sequence. The exact sequence may vary from embodiment to embodiment. Lists and Blobs, for example, may be explicitly ordered, (e.g. via explicit offsets). Sets and Maps may be implicitly ordered via a deterministic sort order, such as, without limitation:

- By ascending (or descending) value, in the case of Integer & Float types
- By ascending (or descending) value lexicographically, in the case of Strings
- By ascending (or descending) hash value, for all other types.

Leaf nodes of Prolly trees comprise primitive or other logical values. Non-leaf nodes comprise at least a value that references location(s) of children nodes. In an embodiment, non-leaf nodes may comprise, for example, sequences of tuples: <X, Ref>, where Ref is the hash value for the node (and address of the chunk in which the node's children are stored), while X is:

- The number of logical values in the referenced subtree, in the case of List<T> and Blob<T>
- The maximum logical value contained in the referenced subtree, in the case of Set<T> and Map<K,V>.

A Prolly tree is constructed utilizing a stack of sequence chunkers, each configured to implement a chunking algorithm, such as rolling hash function. Each chunker in the stack operates on different level of the Prolly tree, with the bottom-level chunker operating on a previously-sequenced grouped of values, and each successively higher-level chunker operating on the output of the immediately lower-level chunker. The specific chunking logic implemented by each chunker in the stack may be the same or different, depending on the embodiment. Where rolling hash functions are used for chunk detection, the rolling hash function implemented by a given chunker for a given level may be any suitable function, having a rolling window of any suitable size, so long as the same rolling hash function is used universally on that level across all database peers. For convenience, examples are given herein with respect to embodiments where a rolling hash function is the chunk detection logic, though it should be understood that in other embodiments, any chunking algorithm may be used in place of the rolling hash function. One may, for example, use sha1, simply computing the sha1 one of byte n→n+m, and then n+1→n+m+1, and then n+2→n+m+2, etc.

A sequence chunker operates start-to-finish, over a sequence of values that collectively form the nodes of the tree at a tree-level associated with the chunker. After visiting each value, the sequence chunker may (or may not) draw a chunk boundary, depending on boundary detection logic. The chunk detection logic may be, for example, that a node/value is determined to be a chunk boundary if moving the node/value into a rolling hash window results in a rolling hash value which matches a chosen target pattern (e.g. 0000). The end of a sequence is an implicit chunk boundary. When a chunk boundary is drawn, all the nodes/values visited since the immediately previous chunk boundary (or the start of the sequence) are encoded as a chunk. The hash value of the chunk, which may serve as a reference by which the node/chunk may be located, is given as the next node/value in a sequence of nodes/values to be processed by a next higher sequence chunker associated with a next higher level of the tree. The collection of nodes/values within the chunk are, in effect, children of this higher-level node. Processing of the sequence of nodes/values for the current level continues until complete, generating any number of additional chunks for the current level, along with corresponding nodes/values for the next level. The next higher sequence chunker, in turn, operates on the sequence of nodes/values generated for the next highest level, so as to generate chunks at that level. The process is repeated for any number of levels, until only one node/value is generated for a level, which is deemed to be the root node/level.

Figure 5:
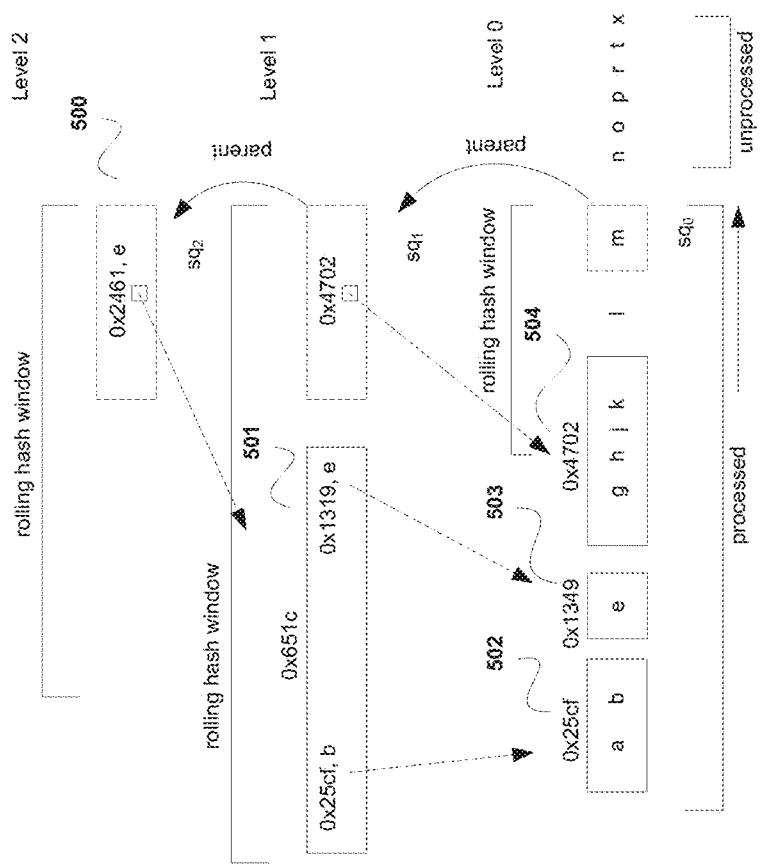
FIG. 5 illustrates an example process for constructing a Prolly tree.

FIG. 5 illustrates a moment in producing a hypothetical Prolly tree utilizing a stack of sequence chunkers, according to an embodiment. In the example, a Prolly tree is constructed, taking as input a sequence of items, [a, b, e, g, h, j, k, l, m, n, o, p, r, t, x].

Initially, a single sequence chunker is created and fed the in-order sequence of input items. As each item is visited, its value is passed to a rolling hash function which is configured to determine chunks of a chosen average size. In FIG. 5, items [a, b, e, g, h, j, k, l, m] have been visited.

The bottom-most (Level 0) sequence chunker has determined chunk boundaries immediately following items [b, e, k], created chunks 502, 503, 504 out of [a, b], [e], [g, h, j, k] with hashes 0x25cf, 0x1349, 0x4702, respectively. The hashes [0x25cf, 0x1349, 0x4702] have become the sequence of items which are being processed by the next-higher (Level 1) sequence chunker, which has respectively determined a single chunk boundary following item 501 [0x1349], creating chunk [0x2461] and passing it to the level 2 sequence chunker as the first item 500 in its sequence.

Database peers support read and write operations. The insertion, update and deleting of values is handled via issuing write operations to a database peer to create a new data set identified by a new hash value, representing the updated data set at a new point in time. Any write operation on a Prolly tree can be re-expressed as a series of splice operations on its sequence of values (e.g. at a given index, remove N items and insert a given sequence of items). According to an embodiment, modifications to a Prolly tree are performed copy-on-write. They return a new tree which is the logical result of making the desired changes to the input tree.

The resulting tree retains the invariant that it has the same shape as the result of any other sequence of modifications which result in the same final state. Another way of stating this is: the resulting tree of a modification is identical to a new tree created given the values in the resulting tree.

The approach to modifying a Prolly tree is to logically re-create it from scratch, but to avoid doing all the work by using the previous state of the tree to return the memorized work over subsequences whose output cannot be affected.

Because the existence of a chunk boundary at any point in a sequence is dependent only on the item and the previous N−1 items, where N is the size of the rolling hash window, chunks which contain only values which fall outside this window will necessarily be unaffected.

Thus, for each level of the tree, only a subsequence of values must be reprocessed, namely the subsequence of values which are contained within chunks which have any values for which the chunk boundary may have changed.

Figure 6:
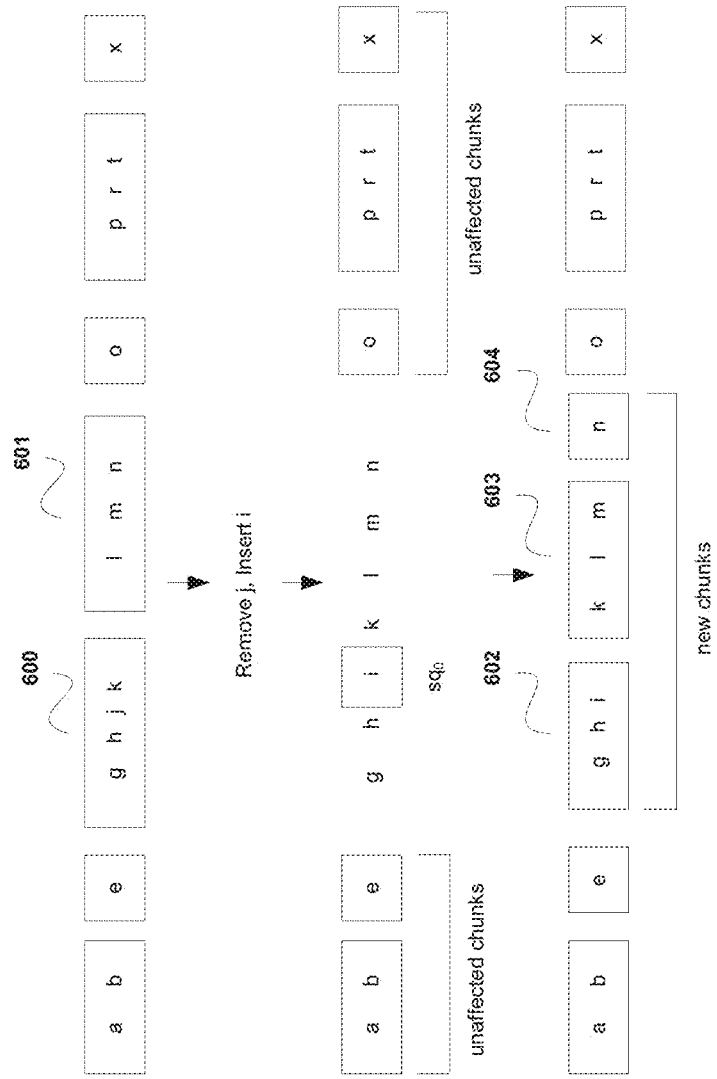
FIG. 6 illustrates an example of how modifications to an example sequence may affect rolling hashes and chunking processes.

FIG. 6 illustrates the process of logically mutating a Prolly tree. In the example, a Prolly tree containing the sequence [a, b, e, g, h, j, k, l, m, n, o, p, r, t, x] has previously been constructed, which resulted in the creation of the chunks [a, b], [e], [g, h, j, k], [l, m, n], [o], [p, r, t] and [x]. The desired mutation is equivalent to removing j from the sequence and inserting i.

In this example, the window size of the rolling hash at level 0 is 3 items, so the chunks [a, b], and [e] do not need to be visited because the change in value from j to i cannot have affected their respective chunk boundaries. A sequence chunker is created at level 0 and fed items [g, h, i, k, l, m, n] which represent the full sequence of items within chunks at that level where chunk boundaries could be affected based on the width of the rolling hash window.

In this example, the change of item i to j results in chunk boundaries being determined such that chunks 602, 603, 604 [g, h, i], [k, l, m] and [n] must replace chunks 600, 601 [g, h, j, k] and [l, m, n] from the previous state. Level 1 of the new tree is constructed in a similar fashion, where sequence items which represent [g, h, j, k] and [l, m, n] must be removed and items representing [g, h, i], [k, l, m] and [n] must be inserted. This continues until a new root is produced.

What results is a Prolly tree which contains the the sequence [a, b, e, g, h, i, k, l, m, n, o, p, r, t, x], with a shape identical to any Prolly tree containing the same values, no matter what order of operations resulted in the creation of the tree.

Each node includes or is otherwise associated with metadata that indicates the location(s) of its children nodes and some information about the sub-values within those children nodes (e.g. their respective ranges). Because Prolly trees are ordered search trees, finding an element can be performed using conventional techniques, such as navigating down the tree, using the metadata at each node to choose which child link to follow. Similarly, ranges of values can be retrieved efficiently by finding the start position for a given range, reading forward along leaf nodes, navigating to a parent and down to a subsequent child as necessary, until the end position for the given range is reached.

Set operations such as union, intersection, and difference can be performed efficiently by exploiting the fact that at any non-leaf level, if two trees have a common reference to a sub-tree, then both trees contain an identical subsequence of values. Note that common references to sub-trees will only be found at the same level of the two trees (counting from the bottom up), and that subsequences can exist in trees of differing total height.

Figure 8:
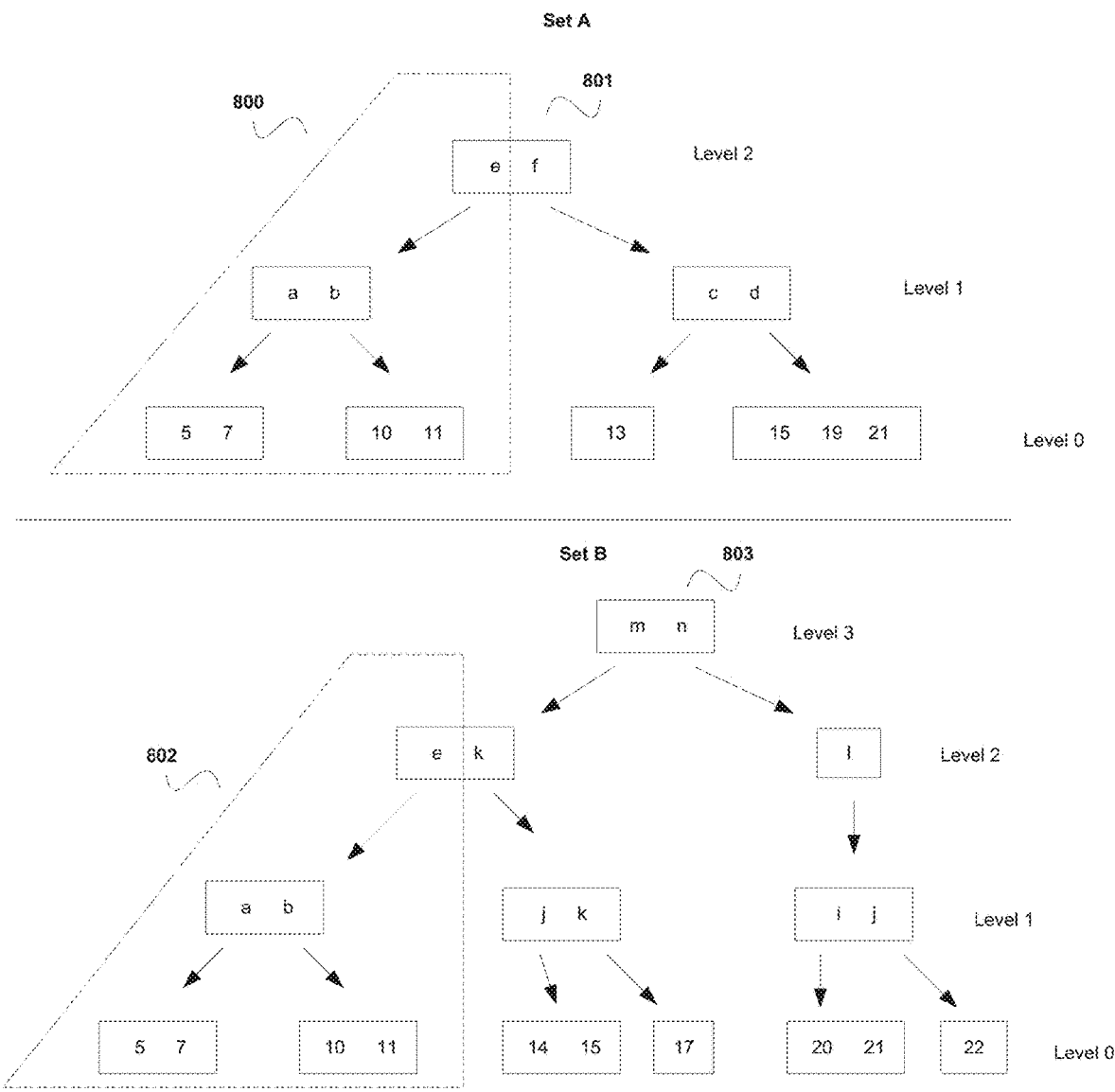
FIG. 8 illustrates an example method of searching for common sub-trees.

FIG. 8 illustrates two hypothetical Prolly trees, representing two sets A and B, and which might be inputs to set union, intersection, or difference operations, according to an embodiment. In the figure, the two Prolly trees encode respective sequences which have a common sub-sequence: [5, 7, 10, 11]. The common subsequence is encoded as a common subtree of each Prolly tree 800, 802 that starts from the same root node (in this case, e). Thus, the union, intersection and difference operations can exploit this property by, for example, visiting the two trees top-down, starting from 801 and 803, and discovering they both contain (e). No more work needs to be done in order to discover that the subsequence represented by [e] must be contained in the result of union and intersection operations, and excluded from the result of the difference operation.

In an embodiment, since Prolly trees are analogous to traditional database B-Trees, a mapping operation, implemented as a Prolly Tree, can be used to perform efficient look-ups and range scans in the same way secondary indices in a RDBMS are used.

According to an embodiment, Prolly trees which encode sets of a common type can be used for searching in a way analogous to the way an inverted index works. A search domain can be chosen where potential results are represented by the hash of their value. Then, for desired boolean conditions, a set of references is constructed which represents the domain values for which that condition is true.

From there, any boolean expression which combines conditions and the logical operators OR and AND can be converted to a graph of union (AND) and intersection (OR) operations over the corresponding condition sets, and computed in time roughly proportional to log(n)*m, where n is the size of the largest condition set and m is the number of values in the resulting set.

8.0. FUNCTIONAL OVERVIEW—TREE CREATION AND MANAGEMENT

8.1. Example Tree Creation Flow

Figure 10:
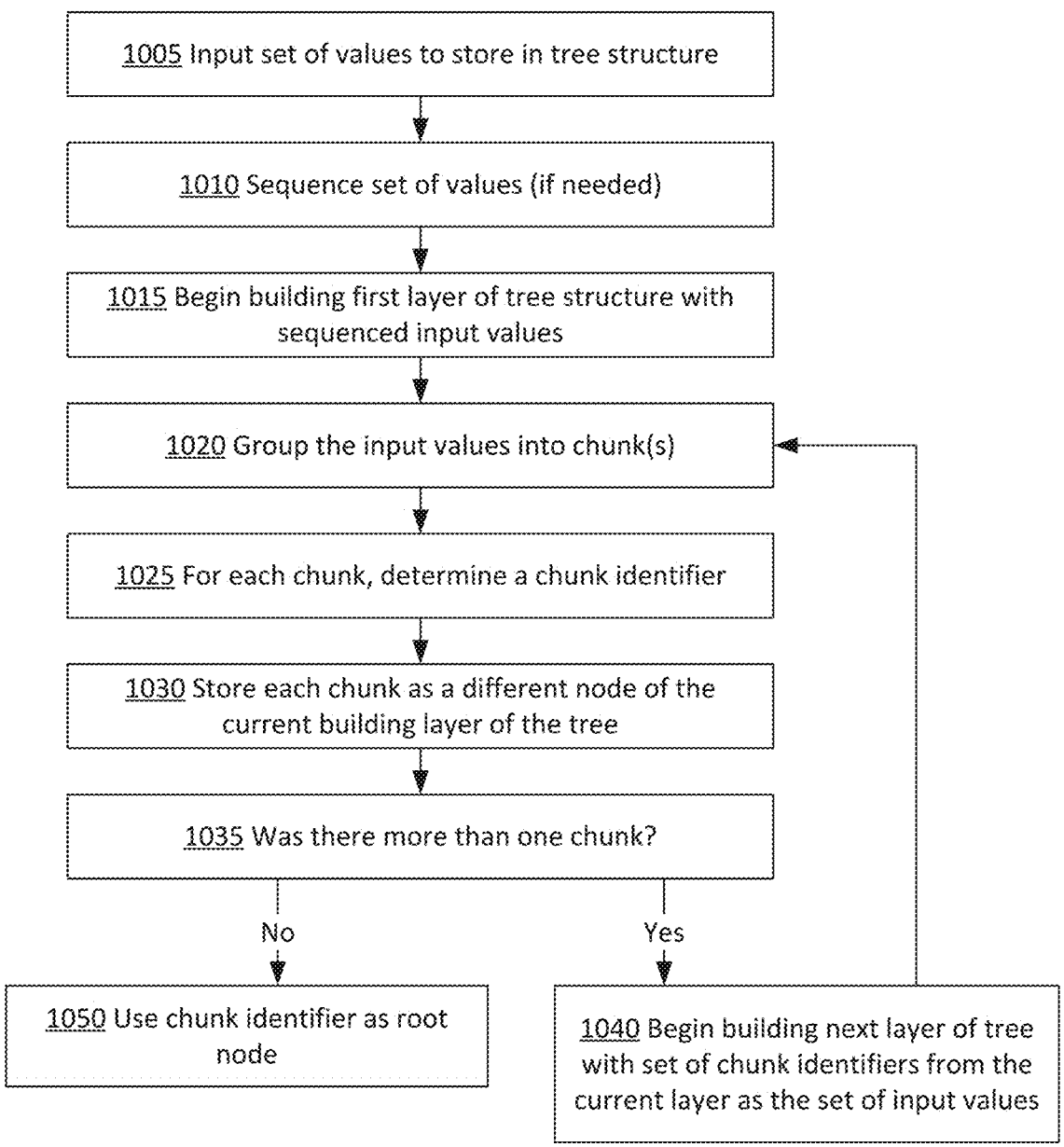
FIG. 10 is a flow chart illustrating an example process flow for generating a tree-like structure.

FIG. 10 is a flow chart illustrating an example process flow for generating a tree-like structure, such as a Prolly tree, according to an embodiment. The various elements of flow 1000 may be performed in a variety of systems, including systems such as system 100 described above. The system may be a single computing device, or a set of networked computing devices, in which case flow 1000 may be executed at various times by each peer computing device within the system at which the tree-like structure is to be stored. The tree structure may be generated for any of a variety of purposes, including versioning, synchronization of a set of values across multiple peer computing devices in the implementing system, and/or indexing of the set of values for search purposes. In an embodiment, flow 1000 is only used to initially generate a tree from a seed set of values. Other process flows, such as flow 1200, may be utilized to manipulate the tree thereafter.

In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Block 1005 comprises inputting a set of values that is to be stored in the tree structure. The values may be any set of values that would be suitable for representation in a tree-like structure. For instance, the set of values may be an array of integers, a list of untyped values, a collection of user-defined structures, a directory of files, an image (in which the values might be, for instance, individual bytes or other sub-portions), a set of hash values or pointers for chunks or other values, or any other suitable data set.

Block 1010 comprises sequencing the set of values, if necessary. The sequencing may comprise arranging the set of values in any suitable order, so long as each peer that will store the tree is configured to execute the same ordering algorithm. For instance, the order may be alphabetical or numeric, where such comparisons make sense. In the case of complex values, block 1010 may comprise serializing the values and/or numerically sorting the values in their serialized form. Or, block 1010 may comprise sorting the values by some other identifying feature, such as by a particular field within each value, or by hash values respectively output by a hash function on each value. In an embodiment, the values may already be sequenced and/or have an implicit sequence, making block 1010 an optional or trivial step.

Block 1015 comprises beginning the building of a first layer of the tree structure. Block 1015 is described mostly for explanatory purposes, as block 1015 may not necessarily involve the performance of any action. However, in an embodiment, various memory or storage management tasks may be necessary in preparing to build the first layer of the tree structure.

Block 1020 comprises grouping the input values into one or more chunks. The grouping may involve any suitable algorithm, so long as each peer within the implementing system is configured to always execute the same algorithm at given particular level of the tree. In an embodiment, a chunk detection algorithm is used, such as described elsewhere herein. In an embodiment, the grouping algorithm is configured such that the probable size of a given chunk is, on average, a certain determined value, as explained elsewhere herein. In an embodiment, the grouping algorithm may limit the maximum size that a given chunk may be.

Block 1025 comprises determining a chunk identifier for each chunk. Determining the chunk identifier may comprise, for instance, inputting the values assigned to a chunk into a function of some kind, and using the output as an identifier. In an embodiment, any function that produces a reasonably unique output may be utilized. In an embodiment, a hash function is utilized, such as described elsewhere herein. In some embodiments, block 1020 and 1025 may be performed concurrently (e.g. as each chunk is created, its identifier is also determined). In other embodiments, block 1025 may be performed separately from 1020.

Block 1030 comprises storing each chunk as a different node of the tree layer currently being built. In an embodiment, the chunk identifier may be associated with the location using a mapping table or mapping function of some kind. For instance, in an embodiment, the chunk identifier may be utilized as a logical address within a memory space allocated to the tree, and the chunk may be stored at this logical address. In an embodiment, the values within the chunk are stored directly at the location. In another embodiment, pointers to the values may be stored at this location instead. Again, this step may be performed concurrently with, or after, blocks 1020 and 1025.

Block 1035 comprises determining how many chunks were created for the current layer, per block 1020. If more than one chunk was created, then flow 1000 proceeds to block 1040 to begin building the next layer of the tree. This next layer will be a parent layer to the layer created in the last iteration of blocks 1020-1035 (e.g. the second layer, if this is the first pass through block 1040). Creation of the next layer involves returning to block 1020, and performing blocks 1020-1035 with respect to a new set of input values, which is the set of chunk identifiers determined in the preceding iteration of block 1025. Each node within this next layer will, by virtue of storing one or more chunk identifiers for the chunks in the layer just created, indicate these chunks are its child nodes. Repeated iterations of blocks 1020-1040 will thus form a hierarchy of nodes at two or more levels of the tree structure.

According to an embodiment, certain metadata may also be passed along with the chunk identifiers so as to be stored in association with the chunk identifiers in the next layer. Such metadata may indicate any suitable characteristics of the values encoded in the subtree formed by the corresponding chunk, such as minimum or maximum values.

If, in block 1035, it is determined that only one chunk was created for the current layer, then flow proceeds to block 1050. Since only one chunk is generated, the top of the tree has been reached, and the chunk identifier of that chunk effectively serves as the root node of the tree.

Flow 1000 illustrates only one of many possible flows for generating a tree structure suitable for use for techniques described herein. Other flows may include fewer, additional, or different elements, in varying arrangements. For example, in an embodiment, multiple iterations of blocks 1020-1035 are performed concurrently, such that two or more layers are being generated by different execution threads (i.e. "chunkers") at the same time. Hence, as a chunk identifier at a lower level is created, it is immediately fed as an input value to the execution thread for its parent layer. Also, a new execution thread may be generated for the parent layer, if this is the first time a value has been derived for the parent layer.

Note that an entity executing flow 1000 need not necessarily use flow 1000 to generate every layer of the tree structure. For instance, though the term "first" may in an embodiment mean the "lowest" or "leaf" layer of the tree, flow 1000 may instead pick up after one or more lower levels of the tree structure have already been generated at a previous time through a same or different flow. Thus, the term "first" may instead simply refer to the lowest level being generated based on the current execution of flow 1000. Moreover, execution of flow 1000 may be terminated at any layer, leaving the rest of the tree to be generated at another time (if needed).

8.2. Example Chunking Flow

Figure 11:
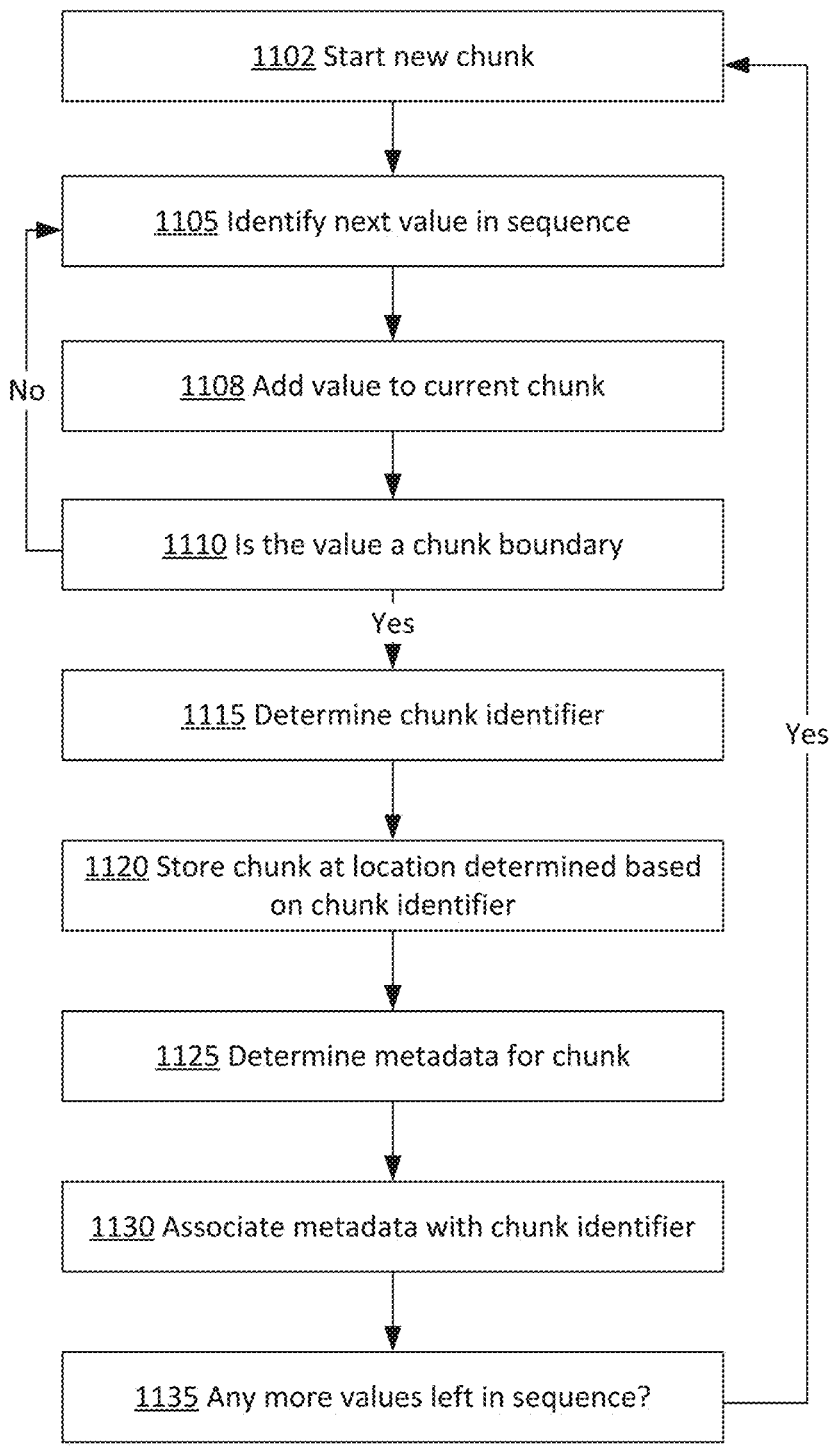
FIG. 11 is a flow chart illustrating an example process flow for generating chunks for a tree-like structure.

FIG. 11 is a flow chart illustrating an example process flow 1100 for generating chunks for a tree-like structure, such as that created in flow 1000 according to an embodiment. The various elements of flow 1100 may be performed in a variety of systems, including systems such as system 100 described above. In an embodiment, flow 1100 is an example implementation of blocks 1020-1030 of flow 1000. In an embodiment, flow 1100 may also or instead be utilized in other process flows that involve generating chunks.

Flow 1100 is performed with respect to a sequence of values. The sequence may be, for instance, a sequence of values determined per block 1010, or a sequence of chunk identifiers from another level, sorted by the order in which the chunks were created.

Block 1102 comprises starting a new chunk. Block 1102 is described primarily for explanatory purposes, as in some embodiments, no actual steps need be performed to start the chunk. However, in other embodiments, block 1102 may comprise various technical preparations, such as allocating memory to temporarily store data for the chunk.

Block 1105 comprises identifying the next unprocessed value in the sequence of values—that is, the next value that is to be added to a chunk. If this is the first iteration of block 1105, the first value is identified. Otherwise the first unprocessed value in the sequence is identified.

Block 1108 comprises adding the value to the current chunk. For instance, this may entail temporarily storing some data that associates the value with the chunk.

Block 1110 comprises determining whether the value is a chunk boundary. Any mechanism for making this determination may be utilized. The determination may involve, for instance, determining whether output of a certain function of the value, such as a rolling hash function over a window of previous values in the sequence, matches certain criteria. Alternatively, or additionally, the determination may involve determining whether the number of values processed since the last chunk boundary is at least a certain amount and/or above a certain amount.

If the value is not determined to be a chunk boundary, flow returns to block 1105 for processing of the next value in the sequence. Otherwise, if the value is determined to be a chunk boundary, flow proceeds to block 1115.

Block 1115 comprises determining a chunk identifier for the chunk. Any suitable technique for determining a chunk identifier may be utilized, including hash functions and/or serialization, as described elsewhere herein. Block 1120 comprises storing the chunk at a location determined based on the chunk identifier, as described in other sections.

Block 1125 comprises determining chunk metadata, as described in other sections. Block 1130 comprises associating this metadata with the chunk identifier. In an embodiment, the chunk identifier and its associated metadata may then be fed as input to an entity executing flow 1100 to generate chunks at a higher layer in the tree.

Block 1135 comprises determining whether any values remain in the sequence. If so, flow 1100 returns to block 1102 to begin generating a new chunk. Otherwise, flow 1100 ends.

Flow 1100 illustrates only one of many possible flows for generating chunks. Other flows may include fewer, additional, or different elements, in varying arrangements. For instance, blocks 1125 and 1130 may be optional in an embodiment.

8.3. Example Tree Modification Flow

FIG. 12 is a flow chart illustrating an example process flow 1200 for modifying a tree-like structure, such as that generated in flow 1000. The various elements of flow 1200 may be performed in a variety of systems, including systems such as system 100 described above. In an embodiment, flow 1200 offers a quicker process flow for manipulating a tree-like structure that already exists, rather than rebuilding the tree-like structure from scratch.

Block 1205 comprises identifying values to insert or remove from a current layer. For instance, block 1205 may comprise identifying values to insert and/or remove from the leaf nodes of the tree-like structure. Such insertion and/or deletion may occur in response to any of a variety of events that manipulate the data set represented by the tree-like structure, such as database commands, file editing commands, and so forth.

Block 1210 comprises identifying one or more chunks of the current layer that are affected by the insertion and/or deletion of values. Significantly, assuming that only minor changes are made, and that the current layer is not one of the higher levels of the tree, not all chunks of the current layer need be reconstructed. For instance, block 1210 may comprise determining insertion and/or deletion positions for the added or removed values within the sequence of values encoded within the current layer. As described elsewhere, it may be determined that only chunks which store values that are within a certain distance of the insertion or deletion position(s) (e.g. the size of a rolling hash window) are affected by the insertion or deletion operation.

Block 1215 comprises identifying a sub-sequence of values that begins with the first value of the first affected chunk and ending with the last value of the last affected chunk. The chunking algorithm will need to be re-executed on this sub-sequence, but not on the rest of the sequence encoded within the current layer.

Block 1220 comprises inserting and/or removing the values from block 1205 at their appropriate positions within the sub-sequence.

Block 1225 comprises re-grouping the sub-sequence into one or more new chunks to replace the one or more affected chunks. This re-grouping is performed using the same grouping logic that was previously used to chunk the sequence at the current layer, such as that used in block 1020. The re-grouping logic creates at least one chunk that is different from the affected chunk(s). In some cases, all chunk(s) will be replaced, meaning all of the new chunk(s) are newly created in block 1225. In others, certain chunk(s) may be kept, depending on the specific values and the grouping logic, and hence some of the new chunk(s) may be the same as some of the affected chunk(s).

Block 1230 comprises determining chunk identifier(s) for the new chunk(s), in similar manner as to described in block 1025.

Block 1235 comprises storing the new chunk(s), in similar manner as described with respect to block 1030. In an embodiment where chunks are stored in locations that are based on their chunk identifiers, and chunk identifier is reasonably likely to be unique, the affected chunk(s) may be replaced without actually being deleted or overwritten, as any newly created chunk should have its own storage location that is different from those of the affected chunk(s). Retaining the affected chunk(s) in storage may be useful for versioning purposes. In other embodiments, the affected chunk(s) may be deleted at some point to reduce storage demands.

Block 1240 comprises, in the parent layer of the current layer, replacing the chunk identifier(s) of the affected chunk(s) with those of the new chunk(s). This may comprise, for instance, removing a sub-sequence of value(s) corresponding to the affected chunk identifier(s) from the parent layer, and inserting in its place a sub-sequence of value(s) corresponding to the new chunk identifier(s) (arranged in the order they were created). This may be accomplished, for example, by performing blocks 1210-1240 with respect to the parent level, using the affected chunk identifier(s) as the value(s) to remove and the new chunk identifier(s) as the value(s) to insert.

If the parent layer is a single chunk identifier, then block 1240 instead involves simply changing the root node of the tree to the new chunk identifier. The affected chunk identifier may then serve as a pointer to the previously committed version of the tree.

Flow 1200 illustrates only one of many possible flows for inserting and/or removing values from a tree. Other flows may include fewer, additional, or different elements, in varying arrangements.

9.0. VERSIONING

According to an embodiment, all datasets are modeled as sequences of commit objects, or "commits." A commit object represents the state of a database peer's dataset at a point in time. The commit object "points" to a graph of the dataset, such as a Prolly tree. Changes to state are represented by progressions of commits. Values, including commits, are immutable.

Figure 7:
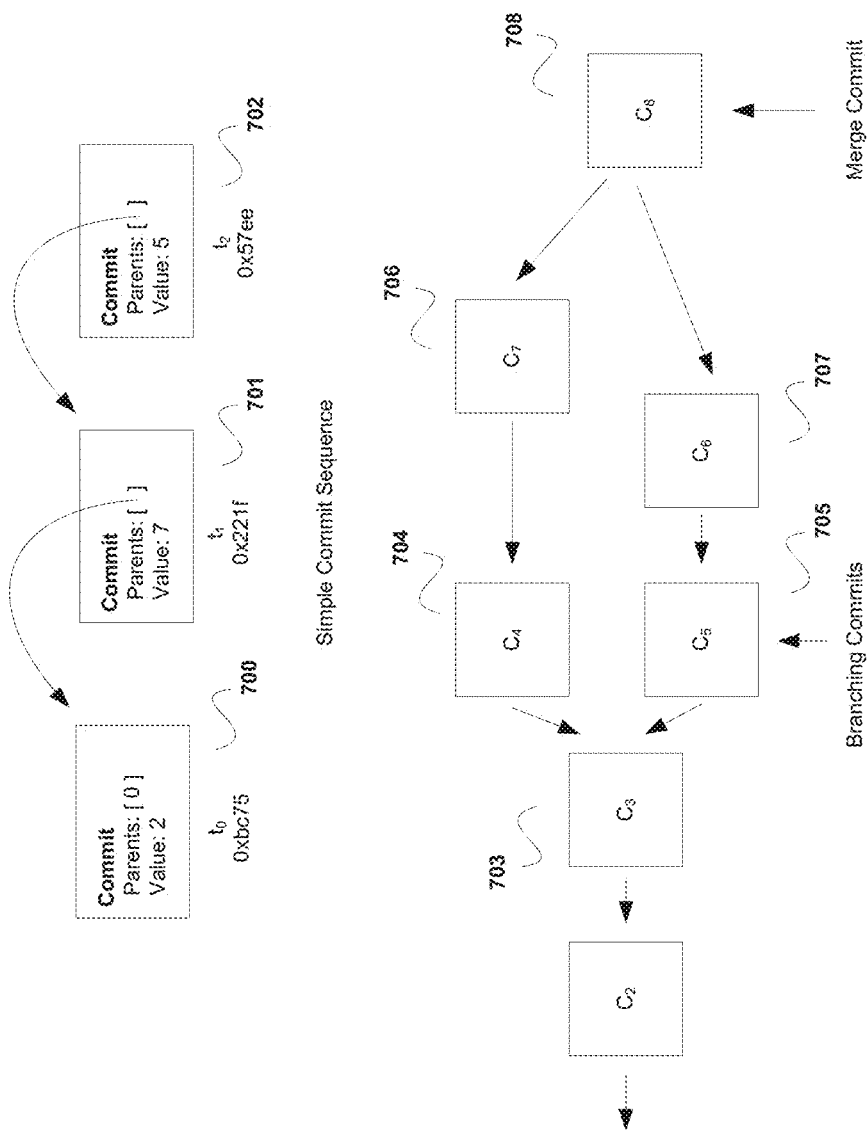
FIG. 7 illustrates an example commit sequence.

FIG. 7 illustrates progressions of state changes modelled as sequences of commits. The upper sequence, labelled "Simple Commit Sequence", represents a dataset which models the value of a single numeric value. In commit 700, the value is 2, which is "mutated" to 7 in commit 701 and then 5 in commit 702. The final commit 702 has commit 701 as its "parent" commit, which, in turn, has commit 700 as its parent commit. Commit 700 has no parent commit.

The commit graph shown in the lower portion of FIG. 7 represents a more complex sequence of commits and illustrates the fact that commit graphs may diverge and converge. In this graph, commits 704 and 705 both represent divergent logical mutations to the state represented in commit 703. The divergent lineages are merged together in commit 708. One way this could have occurred is if two database peers had synchronized as of commit 703. Subsequently the two peers extended 703 with [704, 706] and [705, 707] respectively (without communicating). Finally one of the two peers attempted to synchronize, discovered the divergence and created commit 708, resolving the difference and representing the reconciliation by creating commit 708 which has both commit 706 and 707 as parents.

Conflicts between datasets in different commit objects may be resolved using any suitable conflict resolution technique. Resolution strategies are greatly enhanced versus conventional systems which generally only know the final state of the respective conflicting values, since as a result of the techniques described herein, the final state as well as what changes occurred relative to the most recent agreed upon state can easily be computed.

10.0. DATA SYNCHRONIZATION AND MOVEMENT

In an embodiment, some or all of the techniques described herein may be utilized for moving data between peers efficiently, such as may occur in replication, synchronization, or other data management processes. These processes often involve one peer pulling a value, which may be comprised of many storage chunks, from a remote peer, into its local storage. Distributed database systems therefore benefit from being able to perform this operation efficiently, while minimizing transfer of chunks which it is already in possession of. Various techniques can be used to efficiently reason about which chunks to transfer, and these techniques may make use of one or more of the following:

10.1. Ref Height

In an embodiment, when a chunk references another chunk, encoded with the reference is a height value which logically represents the longest path that may be traversed from this chunk before reaching a chunk that has no child references. A Ref's height is one if it directly references a chunk that has no out-bound references. Otherwise its height is 1+the maximum height of all the references contained in the chunk it directly references.

To illustrate the use of height, consider a Ref of height 5 and a Ref of height 7. The chunk referenced by the Ref of height 7 cannot be reachable at all from the Ref of height 5, since, for that to be so, its height would have to be at least 7. Hence, data management processes may utilize a height value encoded within each chunk to quickly make determinations that certain chunks cannot be equivalent and/or that a certain first chunk cannot possibly be a member of a certain second chunk.

10.2. Type Information

In an embodiment, a chunk has encoded within it type information about the logical value the chunk encodes. This can be useful, for example, in ruling out the possibility that two chunks can reach any common descendent chunks. For example, A List<Person> cannot possibly share chunks with a List<Job>.

According to an embodiment, the height difference and type information may be utilized for managing data within datasets stored in structures other than a Prolly tree. For instance, the height difference may be utilized for datasets stored within Merkle directed acyclic graphs or other content-addressable tree-like structures, if the chunk-height is similar encoded (except applied to nodes as opposed to chunks).

11.0. ACCESS CONTROL

Depending on the embodiment, different levels of access control may be provided for a given data element, each level corresponding to a different set of acts or operations that may be performed with the data element. For example, in an embodiment, a client may have read access, read/write access, or no access to a value or group of values. In an embodiment, rather than being limited to predefined access control levels, a variety of access control levels may be provided by assigning clients various permissions, in a set of permissions, with each permission in the set having various implications regarding what operations are available to the client with respect to the data. For example, one client may have read permission, but not write permission. Another client may have write permission, but not have permission to delete a value. Another client may have append permission. Yet another client may have all possible permissions, or none of the possible permissions. The techniques described herein are not limited to any particular set of permissions or access control levels. Therefore, the term "access," within the context of acts such as "providing access," "granting access," "denying access," and the like, should be understood as being equally applicable to any specific access control level or set of permissions supported by the embodiment.

According to an embodiment, a database system provides course-grained access control to a single logical database by allowing or disallowing access for a given client. However, databases may contain multiple datasets, and the owner of a database may wish to allow a given party to access certain values within a database while disallowing others. In order to allow this, in an embodiment, a database system implements path-based access control within a given database.

As previously discussed, in an embodiment, any value may be represented as a one or more chunks, which form a directly acyclic graph of sub-values. In the model of path-based access control, if a client is allowed access to a given chunk, then it is implicit that the client may also have access to any chunk which is reachable from that chunk. In other words, clients may be granted access to a graph (or subgraph) of chunks within a database simply by specifying that the clients have access to the root chunk of the graph (or subgraph).

One way to implement path-based access control, in an embodiment, is to require that, for each chunk requested over the network, a client must also include the chunks which form the path from the "root" chunk it has access to the desired chunk. In this scenario the server must read each chunk from the root chunk along the path and validate that it contains the next chunk in the path. Obviously, this would require significant read and processing load on the server to accomplish.

In order to avoid such load, in an embodiment, a client and server implement a scheme whereby, when the client requests chunks, each chunk the server delivers is accompanied with an access token. A client can use an access token for a given chunk to prove that the client has access to any chunk which is referenced from the given chunk. When making subsequent requests for chunks, the client must include sufficient access tokens to chunks which contain references to all the chunks presently being requested.

An access token may take a variety of forms depending on the embodiment. For example, in one embodiment, an access token is logically represented as follows:

token=encrypt(chunk-hash, clientId, timeout)

In other words, the token is a byte sequence, which is the result of the server encrypting, with a private (symmetric) key, a concatenation of the hash of a given chunk, the client's identifier, and time-out period.

When the server receives a request for a sequence of chunks from a client, the server also receives a sequence of access tokens. For each access token, the server uses its private key to decrypt the payload, verify the clientId matches the current client, and verify that the timeout has not passed. The server can then load the chunk, and enter all contained references into a white list of chunks that may be allowed during this request. Then, for each chunk requested via its hash, the server simply checks the set of chunks references which were logical referenced by the supplied access tokens.

In this way, the client may provide proof of access to a sequence of requested chunks with a typically small number of access tokens. In general, the number of additional read operations required for the server will be the log of the total number of chunks needed by the client during its processing.

12.0. COMMIT VALIDATION

In certain embodiments, a database maintained using techniques described herein is an immutable database which models changes in state as a progression of commit nodes that are possibly diverging and/or converging. Any given client making changes has what is effectively a "snapshot" isolation level of the database. That is, the view of the data which the client sees in the database during a transaction cannot possibly be affected by the actions of any other client during the course of the transaction.

Committing to a dataset involves writing a value which is referenced by a commit object. The value can be as simple or complex as necessary, and frequently is represented with a mix of new and old chunks. For example, for a commit value of a 'List<Person>' type, which contained a million people in a previous state, if the logical change is to add a Person value to the list, then the new value will likely contain a handful of new nodes within a prolly tree which represent a new "spine" of the tree whereby most of the nodes in the previous state are referenced by the new nodes (including a the new root).

A database must remain valid in the face of many kinds of failures, including network failures, CPU failures, power failures, and client logic failures. In an embodiment, a database system maintains validity of a database during the commit process along many axes, including encoding and referential. Encoding validity ensures that any given chunk in the storage layer represents a valid encoding of a value. Referential integrity ensures that if a value encoded into a chunk references another chunk, then that chunk is present and durable in the storage layer, and its type matches the type described in the reference.

These two validity constraints are enforced in two different settings: in process (where a client is writing directly to its local storage layer) and over the network (where a client is talking to a server over a network link).

12.1. In Process Validity

In an embodiment, ensuring encoding integrity is not a concern when a client is in process, as the client has simply linked into the process binary the encoding and decoding code, which is assumed to be correct.

In an embodiment, ensuring referential integrity is a concern, however. Consider the case described above of inserting a single item in a large collection. In this example a small number of new chunks must be written, and each of these new chunks will reference a very large number of existing chunks. The database could ensure referential integrity by reading and decoding each reference contained within a new chunk before allowing the chunk to be written, but this would result in a very large number of read operations, and quite a bit of processing in order to allow a single new chunk to be written.

Instead, in an embodiment, a database client maintains an in-memory cache of known valid references (along with their type). When a chunk is read or written during the course of a transaction, the reference and type information about the chunk is stored in this in-memory cache. However, references resulting from directly reading or writing a chunk are typically the minority. The majority case is references that are contained *within* chunks that are read. If a chunk is read, then the database client leverages the recursive property of the validity constraint. That is, if the chunk exists, then it must have been validated before writing, and all referenced chunks must also exist and be of the correct type, thus all references within the chunk must be valid references.

Thus, upon writing a chunk, the database client simply verifies that all references within the encoded chunk exactly match an entry in its known-valid reference cache. In doing so, the database client may ensure in process referential integrity without incurring any additional read or write operations.

12.2. Over the Network Validity

According to an embodiment, a database system implements a server process which allows clients to operate against a remote database by directly reading and writing chunks. This design is in keeping with the decentralized nature of the database system: clients are peers in the system, and as such, the aggregate CPU and complexity load on any given server is greatly reduced. However, in some embodiments, because the server is talking to unknown entities on the other side of a network connection, the server must view any client as untrusted and protect the data it serves from malicious or accidental corruption.

A server may therefore ensure encoding validity by exposing a wire API for writing chunks, which requires that the hash of every chunk be sent along with the bytes of the chunk. For every chunk that is written, the server decodes the chunk to a value, re-encodes the chunk from the decoded value, computes a new hash of the re-encoded value byte sequence, and, only if the resulting hash matches the corresponding hash sent in the write request, does the server allow the chunk to be accepted.

Ensuring referential integrity over the network requires specialized cooperation between a client and server. As in the case of in-process operation, the client keeps a cache of known-valid chunks as it reads and writes data during the course of processing. However, in addition to keeping information about the existence and type of each reference, the client also keeps a record of the hash (or address) of the chunk within which a given reference was encountered. When the client sends a write request to a server, the client prefixes any chunks the client wishes to write with a sequence of references to chunks which represent a set of chunks which contain references which are contained in newly written chunks.

From the server's perspective, any client may make a logical write request, which contains a sequence of references followed by a sequence of chunks (and a computed hash for each chunk). The server first reads the chunks corresponding to the sequences of references from its database and builds its own list of known-valid references. Then, as the server processes the sequence of chunks to write, it performs the same validation as the in-process case: that is, for each chunk which is written, the chunk must only contain references which are in the known-valid cache.

For example, suppose that a remote server is storing a dataset which contains a List of a million People, which forms a Prolly tree. Further suppose that a client intends to add a new Person to the List. The resulting Prolly tree will share a large number of nodes of the old Prolly tree, but have a new root node, and one new node at the level below the root, and so on down to containing one new leaf node. The new root of the tree will have a similar number of references to the nodes directly below it. Only one of those references will actually be new. All of the other references will be to nodes which existed in the previous state of the Prolly tree.

When the client tries to write this node (chunk) to the server, the server sees a new chunk which contains a number of references to other chunks. The server needs to ensure that the references within the new chunk are not dangling pointers. One way to do this would be for the server to read each reference, decode it, and check that that it is valid. However, the client had to have obtained each of those references from somewhere in order to put the references into the new node. The place the client found them was the root node of the original state of the tree. So when the client is writing the new root node, the client sends along the ref (or hash) of the old root node as a hint of where the server can look to find references which are contained in the new root node, but reference pre-existing nodes. In this manner, the server only needs to read and decode one chunk in order to validate a potentially large number of a references contained in a newly written chunk.

Note the logic so far only works if a client sends a single request containing all new chunks within a given commit. This is because, if the client breaks its work into multiple batches of writes, then it is possible and likely that a later batch may refer to chunks written in an earlier batch, and therefore no chunks can exist within the server's storage which reference those chunks.

In an embodiment, to allow batched write operations, when a server responds to a given write operation, the server responds with a "synthetic reference" which represents the transitive set of all known-valid references thus far. This reference may be used in a subsequent write request within a sequence of references sent back to the server. In this way, servers may remain stateless, given the ability to store a collection of known-valid references for a short time to some persistence layer, and allow referential integrity checking which incurs read operations typically on the order of the log of the number of chunks which the client read during its processing.

13.0. MISCELLANEOUS

In an embodiment, use of the database system is sold as a subscription service by running and hosting database peers that may be utilized for free, or for a subscription fee based on amount of data utilized, number of read or write operations, on a time interval basis. To determine usage and charges, clients of the system would be required to have a user id, session hash after authentication, and/or a public key to identify themselves. Access to read and write operations of specific datasets may be enforced depending on the identity of the client. Clients may be parts of a group where the entire group has permissions to read or write specific data sets that other clients are not able to read or write. A fee-based service may be implemented where the fee is only charged after a defined threshold of usage.

In an embodiment, a database peer may be included in a web browser or other application as a plugin or addon. Examples of web browsers that support plugins and add-ons include, without limitation: Mozilla Firefox plugins, Google Chrome plugins, Microsoft Edge extensions, and Microsoft Internet Explorer add-ons. In an alternative embodiment, the database peer is built directly into a web browser or other application itself. In an embodiment, the database system has a generic data browsing user-interface component that is built in to web browsers or that is available as a plug-in to web browsers.

In an embodiment, the data sets stored in a database peer are encrypted using either asymmetric or symmetric cryptography. In the case of asymmetric cryptography, a client accessing the peer would have a private key, known only to themselves or to a group of which they are a member. A public key associated with the private key is used by a database peer to encrypt data during storage and, optionally, data transmission. Public keys may be found using digital certificates from a well-known organization that handles certificates, as is the case with HTTP SSL certificates. Examples of suitable asymmetric cryptography methods include, without limitation: RSA and Elliptic Curve Cryptography (ECC).

Alternatively, symmetric cryptography may be used, where the client has a private key and this key is used to encrypt data sets for storage or transmission. Examples of suitable symmetric cryptography methods include, without limitation: DES, AES, Twofish, and Serpent. Encryption may be performed on individual storage chunks or groups of data sets. Database peers themselves may utilize encrypted storage devices, such as encrypted SSDs, to encrypt all data stored.

In an embodiment, the data sets are accessible via an application program interface or API. A key or hash may be used to identify clients of the database peer, and clients may be restricted in their ability to read and write to specific data sets. A variety of APIs in varying formats may be made available with some examples including, without limitation: a REST (as defined by Roy Thomas Fielding) format API, a Simple Object Access Protocol or SOAP API, or a custom API based on TCP or UDP sockets. When using REST or SOAP APIs, data may be communicated in, for example, XML or JSON format. The API may be made available over any networking layer, including the HTTP transport layer or HTTPS transport layer, the latter to enable secure encrypted communication between a database client and database peer.

14.0. EXAMPLE EMBODIMENTS

Examples of some embodiments are represented, without limitation, in the following clauses:

According to an embodiment, a distributed database system comprises data encoded utilizing a data structure that is a balanced search tree where the tree structure is solely a function of the values encoded in the tree.

According to an embodiment, a distributed database system comprises data encoded as a tree of nodes in which each node is associated with a unique identifier derived from a logical value that the node represents, and further comprises logic, at each of a plurality of database peers, configured to generate the tree of nodes in such a manner as to ensure that the same unique identifier is always derived for any two nodes that represent a same logical value, and further ensure that the same tree structure is always generated for any given set of logical values.

In an embodiment, the database peers are further configured to store individual copies of the tree of nodes, upon which the database peers independently perform database operations, and to synchronize the individual copies based in part on comparing unique identifiers for nodes in a given copy of the tree to unique identifiers for nodes in other copies of the trees to identify nodes that are the same.

In an embodiment, the unique identifier for a given node is a hash value derived by applying a hash function to the logical value represented by the node.

In an embodiment, the tree contains internal nodes with a probabilistic average number of children.

In an embodiment, a leaf node contains a probabilistic average number of values.

In an embodiment, the value types stored include primitives and user-defined structures, wherein internal nodes represent composite values, at least some of the composite values being sets of values stored in multiple lower-level nodes.

In an embodiment, the tree is a Prolly tree.

According to an embodiment, a method comprises generating or utilizing a database system as described in any of the above clauses.

According to an embodiment, a method comprises storing data within a Prolly tree.

According to an embodiment, a method comprises generating a tree structure by: (a) sequencing a set of values to generate a sequence of values for a particular level within the tree structure; (b) executing chunking logic over the sequence to identify one or more chunks of value(s) from subsequences of the sequence; (c) generating one or more chunk identifying values for the one or more chunks, each chunk of the one or more chunks having a chunk identifying value computed based on the value(s) belong to the chunk; and (d) performing one or more additional iterations of steps (a)-(c), using the one or more chunk identifying values generated in step (c) of the previous iteration as the set of values in the next iteration of step (a), each iteration generating a successively higher level of the tree structure.

In an embodiment, executing the chunking logic comprises: executing a rolling hash function over the sequence to determine rolling hashes for each value in the set of values; wherein the one or more chunks are delimited by values in the sequence whose determined rolling hashes match predefined criteria; wherein the chunk identifying value of a chunk is a hash value computed by serializing the value(s) of the chunk to generate a serialized chunk value and performing a hash function on the serialized chunk value.

In an embodiment, each value in the set of values for a particular level is a node in the tree structure for the particular level, wherein each chunk is a set of nodes in the particular level that descend from a parent node having the chunk identifying value, the parent node belonging to a level of the tree structure that is immediately higher than the particular level.

According to an embodiment, a method comprises performing a set operation between two datasets, or synchronizing two datasets, by comparing identifiers derived from node values within tree structures that represent the two datasets, and determining that values encoded within given subtrees that have same identifiers are the same, potentially using one or more of the systems and/or methods recited in the above clauses.

According to an embodiment, a method comprises tracking versions of a dataset by recording hash values computed from tree-like representations of the dataset at different points in time.

According to an embodiment, a method comprises computing the difference between two graphs using a height-difference algorithm.

According to an embodiment, a method comprises enforcing access control levels on individual chunks within a tree structure, such as a Prolly tree.

According to an embodiment, a method comprises ensuring encoding integrity and/or referential integrity while committing data in a database system in which data is structured as a tree such as a Prolly tree.

According to an embodiment, a method comprises: generating a tree structure based on a particular set of values, the generating comprising, for each layer of a plurality of layers in the tree: grouping a set of input values for the layer into one or more chunks, the set of input values for a lowest layer of the plurality of layers being the particular set of values, the set of input values for each successively higher layer of the plurality of layers being one or more chunk identifiers determined from the one or more chunks of a layer immediately below the higher layer; and storing each chunk of the one or more chunks at a storage location associated with the chunk, each chunk forming a different node in the layer, at least a particular chunk of the one or more chunks comprising at least two or more values from the set of input values.

In an embodiment, a highest layer of the plurality of layers comprises a single chunk, wherein generating the tree structure further comprises generating a root layer above the highest layer of the plurality of layers, the root layer comprising a chunk identifier of the single chunk in the highest layer.

In an embodiment, a certain chunk in a certain layer of the plurality layers comprises at least two values, each of the at least two values operating as a pointer to a different child node chunk in an immediately lower layer.

In an embodiment, the method further comprises generating at least two layers of the plurality of layers at least partially concurrently.

In an embodiment, each chunk identifier of the one or more chunk identifiers is unique to the chunk for which the chunk identifier was generated.

In an embodiment, the particular set of values includes or represents one or more of: an primitive data type, a complex data type, a file, an image, or a binary large object.

In an embodiment, the method further comprises sequencing the particular set of values.

In an embodiment, grouping the set of input values for each layer comprises: iteratively processing each value of the particular set of values in a sequence, using a rolling hash function to identify chunk boundaries; when a chunk boundary is identified, creating a new chunk of the one or more chunks for the layer, the new chunk comprising all processed values in the sequence that have not yet been assigned to any chunk.

In an embodiment, identifying a given value within the sequence to be a chunk boundary comprises determining that a hash value output of the rolling hash function on a window of values including the given value matches pre-defined criteria.

In an embodiment, the method further comprises, for a given chunk having given values, determining the chunk identifier of the given chunk to be a hash value computed by serializing the given values of the chunk to generate a serialized chunk value and performing a hash function on the serialized chunk value.

In an embodiment, the method further comprises determining the storage location of a given chunk based on the chunk identifier of the given chunk.

In an embodiment, the method further comprises storing only a single instance of two identical chunks or values within the tree.

In an embodiment, the method further comprises: generating metadata describing each chunk, the metadata including an indication of characteristics of the values within the chunk; and storing the metadata describing a given chunk in association with the chunk identifier of the given chunk in a parent chunk at a higher layer of the plurality of layers.

In an embodiment, the metadata includes a minimum value and maximum value for each chunk.

In an embodiment, the method further comprises conducting a binary search of the tree structure based on the metadata.

In an embodiment, the method further comprises, during a synchronization operation between the tree structure and a second tree structure, determining not to operate on a subtree of the tree structure based on determining that a root node of the subtree has a chunk identifier that matches that of a second root node of a second subtree within the second tree structure.

In an embodiment, the method further comprises, during a synchronization operation between the tree structure and a second tree structure, determining not to request a subtree of the second tree structure from an external computing device at which the second tree structure is stored based on determining that a root node of the subtree has a chunk identifier that matches that of a second root node of a second subtree within the tree structure.

In an embodiment, the method further comprises, subsequent to generating the tree structure: determining to insert a new value into a particular layer of the tree structure; identifying one or more affected chunks within the particular layer that are impacted by the insertion of the new value, the one or more affected chunks being one or more consecutive chunks that collectively store a sub-sequence of values, the particular layer further including at least one other chunk that will not be affected by the insertion of the new value; inserting the new value into the sub-sequence; regrouping the sub-sequence of values into one or more new chunks to replace the one or more affected chunks, the one or more new chunks including a particular chunk that at least stores the new value; storing the one or more new chunks; replacing, in a parent layer of the particular layer, one or more affected chunk identifiers for the one or more affected chunks with one or more new chunk identifiers for the one or more new chunks.

In an embodiment, the one or more new chunks are greater in number than the one or more affected chunks.

In an embodiment, the one or more new chunks include at least one chunk in common with the one or more affected chunks and at least one chunk that is different than any chunk in the one or more affected chunks, the different chunk including the new value.

In an embodiment, replacing the one or more affected chunk identifiers involves recursively repeating, in successively higher layers of the tree structure, the identifying, inserting, regrouping, and storing, with respect to values of chunk identifiers of chunks that are newly generated as a result of inserting the new value.

In an embodiment, the one or more affected chunks continue to be stored for versioning purposes after being replaced by the one or more new chunks.

In an embodiment, the method further comprises identifying the one or more affected chunks based on determining that each of the one or more affected chunks includes at least one value whose distance from an insertion position of the new value, in a sequence according to which the values in the particular layer are arranged, is within a rolling hash window size, the rolling hash window size having been used to generate the particular layer.

According to an embodiment, a distributed database system comprises, at each of a plurality of database peers: storage media storing a data set encoded as a tree of nodes in which each node is associated with a unique identifier derived from a logical value that the node represents; logic configured to generate the tree of nodes, the generating comprising, for each layer of a plurality of layers in the tree: grouping a set of input values for the layer into one or more chunks, the set of input values for a lowest layer of the plurality of layers being a sequence of values that form the data set, the set of input values for each successively higher layer of the plurality of layers being one or more chunk identifiers determined from the one or more chunks of a layer immediately below the higher layer; and storing each chunk of the one or more chunks at a storage location associated with the chunk, each chunk forming a different node in the layer, at least a particular chunk of the one or more chunks comprising at least two or more values from the set of input values.

In an embodiment, the system further comprises logic, at each of a plurality of database peers, configured to store individual copies of the tree of nodes, upon which the database peers independently perform database operations, and to synchronize the individual copies based in part on comparing unique identifiers for nodes in a given copy of the tree to unique identifiers for nodes in other copies of the trees to identify nodes that are the same.

Other examples of these and other embodiments are found throughout this disclosure.

15.0. IMPLEMENTATION MECHANISM—HARDWARE OVERVIEW

According to one embodiment, the techniques described herein are implemented by one or more special-purpose computing devices. The special-purpose computing devices may be desktop computer systems, portable computer systems, handheld devices, smartphones, media devices, gaming consoles, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques.

Figure 9:
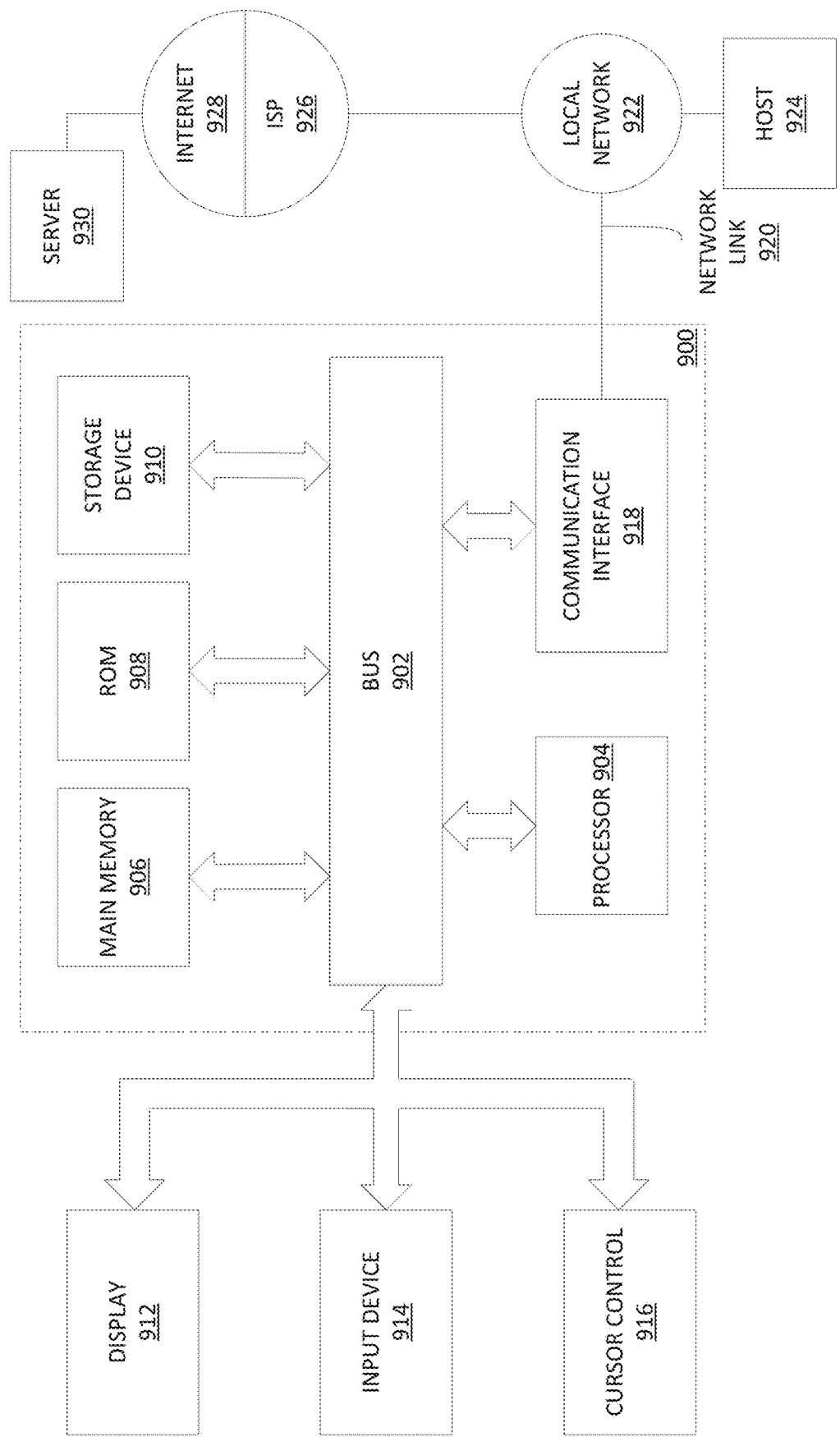
FIG. 9 illustrates an example computer system upon which embodiments may be implemented.

FIG. 9 is a block diagram that illustrates a computer system 900 utilized in implementing the above-described techniques, according to an embodiment. Computer system 900 may be, for example, a desktop computing device, laptop computing device, tablet, smartphone, server appliance, computing mainframe, multimedia device, handheld device, networking apparatus, or any other suitable device.

Computer system 900 includes one or more busses 902 or other communication mechanism for communicating information, and one or more hardware processors 904 coupled with busses 902 for processing information. Hardware processors 904 may be, for example, a general purpose microprocessor. Busses 902 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 900 also includes a main memory 906, such as a random access memory (RAM) or other dynamic or volatile storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes one or more read only memories (ROM) 908 or other static storage devices coupled to bus 902 for storing static information and instructions for processor 904. One or more storage devices 910, such as a solid-state drive (SSD), magnetic disk, optical disk, or other suitable non-volatile storage device, is provided and coupled to bus 902 for storing information and instructions.

Computer system 900 may be coupled via bus 902 to one or more displays 912 for presenting information to a computer user. For instance, computer system 900 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 912 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 912.

In an embodiment, output to display 1112 may be accelerated by one or more graphics processing unit (GPUs) in computer system 1100. A GPU may be, for example, a highly parallelized, multi-core floating point processing unit highly optimized to perform computing operations related to the display of graphics data, 3D data, and/or multimedia. In addition to computing image and/or video data directly for output to display 1112, a GPU may also be used to render imagery or other video data off-screen, and read that data back into a program for off-screen image processing with very high performance. Various other computing tasks may be off-loaded from the processor 1104 to the GPU.

One or more input devices 914 are coupled to bus 902 for communicating information and command selections to processor 904. One example of an input device 914 is a keyboard, including alphanumeric and other keys. Another type of user input device 914 is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. Yet other examples of suitable input devices 914 include a touch-screen panel affixed to a display 912, cameras, microphones, accelerometers, motion detectors, and/or other sensors. In an embodiment, a network-based input device 914 may be utilized. In such an embodiment, user input and/or other information or commands may be relayed via routers and/or switches on a Local Area Network (LAN) or other suitable shared network, or via a peer-to-peer network, from the input device 914 to a network link 920 on the computer system 900.

A computer system 900 may implement techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 900 can receive the data on the network and demodulate the signal to decode the transmitted instructions. Appropriate circuitry can then place the data on bus 902. Bus 902 carries the data to main memory 906, from which processor 904 retrieves and executes the instructions. The instructions received by main memory 906 may optionally be stored on storage device 910 either before or after execution by processor 904.

A computer system 900 may also include, in an embodiment, one or more communication interfaces 918 coupled to bus 902. A communication interface 918 provides a data communication coupling, typically two-way, to a network link 920 that is connected to a local network 922. For example, a communication interface 918 may be an integrated services digital network (ISDN) card, cable modem, satellite modem, or a modem to provide a data communication connection to a corresponding type of telephone line. As another example, the one or more communication interfaces 918 may include a local area network (LAN) card to provide a data communication connection to a compatible LAN. As yet another example, the one or more communication interfaces 918 may include a wireless network interface controller, such as a 802.11-based controller, Bluetooth controller, Long Term Evolution (LTE) modem, and/or other types of wireless interfaces. In any such implementation, communication interface 918 sends and receives electrical, electromagnetic, or optical signals that carry digital data streams representing various types of information.

Network link 920 typically provides data communication through one or more networks to other data devices. For example, network link 920 may provide a connection through local network 922 to a host computer 924 or to data equipment operated by a Service Provider 926. Service Provider 926, which may for example be an Internet Service Provider (ISP), in turn provides data communication services through a wide area network, such as the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

In an embodiment, computer system 900 can send messages and receive data, including program code and/or other types of instructions, through the network(s), network link 920, and communication interface 918. In the Internet example, a server 930 might transmit a requested code for an application program through Internet 928, ISP 926, local network 922 and communication interface 918. The received code may be executed by processor 904 as it is received, and/or stored in storage device 910, or other non-volatile storage for later execution. As another example, information received via a network link 920 may be interpreted and/or processed by a software component of the computer system 900, such as a web browser, application, or server, which in turn issues instructions based thereon to a processor 904, possibly via an operating system and/or other intermediate layers of software components.

In an embodiment, some or all of the systems described herein may be or comprise server computer systems, including one or more computer systems 900 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

16.0. EXTENSIONS AND ALTERNATIVES

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventions have been described with reference to numerous specific details that may vary from implementation to implementation. Thus, the sole and exclusive indicator of what are the inventions, and is intended by the applicants to be the inventions, are the sets of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    generating a tree structure of chunks in a data repository to store a set of values, the generating comprising:
        dividing the set of values amongst first chunks;
        determining first chunk identifiers for the first chunks by, for each chunk of the first chunks, inputting one or more values of the chunk into a function to calculate a chunk identifier for the chunk;
        dividing the first chunk identifiers amongst second chunks;
        determining second chunk identifiers for the second chunks by, for each chunk of the second chunks, inputting one or more of the first chunk identifiers in the chunk into the function to calculate a chunk identifier for the chunk;
        storing each chunk of the first chunks and the second chunks, respectively, at a storage address determined from the chunk identifier determined for the chunk; and
        storing a root chunk that comprises the second chunk identifiers at a storage address determined based on inputting the second chunk identifiers into the function; and
    reading, by one or more computer processors, the set of values by retrieving each chunk of the root chunk, first chunks, and second chunks from the storage address determined for the chunk.

2. A distributed database system comprising, at each of a plurality of database peers:
    storage media storing a set of values in a data repository using a tree of chunks;
    logic configured to generate the tree, the generating comprising:
        dividing the set of values amongst first chunks;
        determining first chunk identifiers for the first chunks by, for each chunk of the first chunks, inputting one or more values of the chunk into a function to calculate a chunk identifier for the chunk;
        dividing the first chunk identifiers amongst second chunks;
        determining second chunk identifiers for the second chunks by, for each chunk of the second chunks, inputting one or more of the first chunk identifiers in the chunk into the function to calculate a chunk identifier for the chunk;
        storing each chunk of the first chunks and the second chunks, respectively, at a storage address determined from the chunk identifier determined for chunk; and
        storing a root chunk that comprises the second chunk identifiers at a storage address determined based on inputting the second chunk identifiers into the function;
    logic configured to read the set of values by retrieving each chunk of the root chunk, first chunks, and second chunks from the storage address determined for the chunk.

3. One or more non-transitory computer-readable media storing instructions that, when executed by one or more computing devices, cause performance of:
    generating a tree structure of chunks in a data repository to store a set of values, the generating comprising:
        dividing the set of values amongst first chunks;
        determining first chunk identifiers for the first chunks by, for each chunk of the first chunks, inputting one or more values of the chunk into a function to calculate a chunk identifier for the chunk;
        dividing the first chunk identifiers amongst second chunks;
        determining second chunk identifiers for the second chunks by, for each chunk of the second chunks, inputting one or more of the first chunk identifiers in the chunk into the function to calculate a chunk identifier for the chunk;
        storing each chunk of the first chunks and the second chunks, respectively, at a storage address determined from the chunk identifier determined for the chunk; and
        storing a root chunk that comprises the second chunk identifiers at a storage address determined based on inputting the second chunk identifiers into the function; and
    reading the set of values by retrieving each chunk of the root chunk, first chunks, and second chunks from the storage address determined for the chunk.

4. The method of claim 1, wherein dividing the set of values comprises:
    iteratively processing each value of the set of values in a sequence, and as each value in the sequence is processed:
        executing a rolling hash function of the value and any previously processed values in the sequence that have not been assigned to one of the first chunks;
        determining, based on output of the rolling hash function, whether a chunk boundary has been reached;
        when a chunk boundary has been reached, creating a new chunk of the first chunks, the new chunk comprising all processed values in the sequence that have not yet been assigned to any of the first chunks.

5. The method of claim 1, further comprising, for a given chunk having given values, determining the chunk identifier of the given chunk to be a hash value computed by serializing the given values of the chunk to generate a serialized chunk value and performing a hash function on the serialized chunk value.

6. The method of claim 1, further comprising:
    generating metadata describing each chunk of the first chunks and the second chunks, the metadata including an indication of characteristics of values within the chunk;
    storing the metadata describing each chunk of the first chunks and the second chunks in association with the chunk identifier of the chunk in a parent chunk at a higher layer of the tree structure;
conducting a binary search of the tree structure based on the metadata.

7. The method of claim 1, further comprising, subsequent to generating the tree structure:
determining to insert a new value into the set of values;
identifying one or more affected chunks of the first chunks that are impacted by the insertion of the new value, the one or more affected chunks being one or more consecutive chunks that collectively store a sub-sequence of the values, the first chunks further including at least one other chunk that will not be affected by the insertion of the new value;
inserting the new value into the sub-sequence;
redividing the sub-sequence of values into one or more new chunks to replace the one or more affected chunks, the one or more new chunks including a particular chunk that at least stores the new value;
storing the one or more new chunks;
updating the first chunk identifiers by replacing any chunk identifiers for the one or more affected chunks with one or more new chunk identifiers for the one or more new chunks, and generating at least one new second chunk of the second chunks along with a new root chunk based on the updated first chunk identifiers.

8. The method of claim 1, wherein each determined storage address is a logical address within a memory space allocated to the tree structure, each determined storage address being allocated for storing only a single chunk.

9. The method of claim 1, further comprising:
forming a first sequence from the set of values;
wherein dividing the set of values comprises splitting the first sequence into the first chunks at boundaries in the first sequence indicated by outputs of a rolling hash function over the first sequence, at least one of the first chunks including multiple values from the set of values;
wherein the first chunk identifiers form a second sequence;
wherein dividing the first chunk identifiers comprises splitting the second sequence into the second chunks at boundaries in the second sequence indicated by outputs of a rolling hash function over the second sequence, at least one of the second chunks including multiple of the first chunk identifiers.

10. The method of claim 1, further comprising:
determining to store a file comprising multiple copies of the set of values;
generating a second tree structure representing the file, the second tree structure including multiple references to the root chunk of the first tree structure in place of the multiple copies of the set of values.

11. The method of claim 1, wherein the tree structure is a first tree structure, the method further comprising:
generating a second tree structure from the first tree structure by replacing at least one of the first chunks, at least one of the second chunks, and the root chunk with new chunks that reflect an updated version of the set of values, the root chunk of the second tree structure also linking to the storage address of a particular chunk of the second chunks in the first tree structure;
reconstructing a previous version of the set of values after the second tree structure has been generated based on a pointer to the root chunk of the first tree structure.

12. The system of claim 2, further comprising logic, at each of the plurality of database peers, configured to store individual copies of the tree, upon which the database peers independently perform database operations, and to synchronize the individual copies based in part on comparing chunk identifiers for the chunks in a given copy of the tree to chunk identifiers for the chunks in other copies of the trees stored at others of the database peers to identify chunks that have changed and require resynchronization.

13. The one or more non-transitory computer-readable media of claim 3, wherein dividing the set of values comprises:
iteratively processing each value of the set of values in a sequence, and as each value in the sequence is processed:
executing a rolling hash function of the value and any previously processed values in the sequence that have not been assigned to one of the first chunks;
determining, based on output of the rolling hash function, whether a chunk boundary has been reached;
when a chunk boundary has been reached, creating a new chunk of the first chunks, the new chunk comprising all processed values in the sequence that have not yet been assigned to any of the first chunks.

14. The one or more non-transitory computer-readable media of claim 3, wherein the instructions, when executed by the one or more computing devices, further cause performance of, for a given chunk having given values, determining the chunk identifier of the given chunk to be a hash value computed by serializing the given values of the chunk to generate a serialized chunk value and performing a hash function on the serialized chunk value.

15. The one or more non-transitory computer-readable media of claim 3, wherein the instructions, when executed by the one or more computing devices, further cause performance of:
generating metadata describing each chunk of the first chunks and the second chunks, the metadata including an indication of characteristics of values within the chunk;
storing the metadata describing each chunk of the first chunks and the second chunks in association with the chunk identifier of the chunk in a parent chunk at a higher layer of the tree structure;
conducting a binary search of the tree structure based on the metadata.

16. The one or more non-transitory computer-readable media of claim 3, wherein the instructions, when executed by the one or more computing devices, further cause performance of, subsequent to generating the tree structure:
determining to insert a new value into the set of values;
identifying one or more affected chunks of the first chunks that are impacted by the insertion of the new value, the one or more affected chunks being one or more consecutive chunks that collectively store a sub-sequence of the values, the first chunks further including at least one other chunk that will not be affected by the insertion of the new value;
inserting the new value into the sub-sequence;
redividing the sub-sequence of values into one or more new chunks to replace the one or more affected chunks, the one or more new chunks including a particular chunk that at least stores the new value;
storing the one or more new chunks;
updating the first chunk identifiers by replacing any chunk identifiers for the one or more affected chunks with one or more new chunk identifiers for the one or more new chunks, and generating at least one new second chunk of the second chunks along with a new root chunk based on the updated first chunk identifiers.

17. The one or more non-transitory computer-readable media of claim 3, wherein each determined storage address is a logical address within a memory space allocated to the tree structure, each determined storage address being allocated for storing only a single chunk.

18. The one or more non-transitory computer-readable media of claim 3, wherein the instructions, when executed by the one or more computing devices, further cause performance of:
forming a first sequence from the set of values;
wherein dividing the set of values comprises splitting the first sequence into the first chunks at boundaries in the first sequence indicated by outputs of a rolling hash function over the first sequence, at least one of the first chunks including multiple values from the set of values;
wherein the first chunk identifiers form a second sequence;
wherein dividing the first chunk identifiers comprises splitting the second sequence into the second chunks at boundaries in the second sequence indicated by outputs of a rolling hash function over the second sequence, at least one of the second chunks including multiple of the first chunk identifiers.

19. The one or more non-transitory computer-readable media of claim 3, wherein the instructions, when executed by the one or more computing devices, further cause performance of:
determining to store a file comprising multiple copies of the set of values;
generating a second tree structure representing the file, the second tree structure including multiple references to the root chunk of the first tree structure in place of the multiple copies of the set of values.

20. The one or more non-transitory computer-readable media of claim 3, wherein the tree structure is a first tree structure, wherein the instructions, when executed by the one or more computing devices, further cause performance of:
generating a second tree structure from the first tree structure by replacing at least one of the first chunks, at least one of the second chunks, and the root chunk with new chunks that reflect an updated version of the set of values, the root chunk of the second tree structure also linking to the storage address of a particular chunk of the second chunks in the first tree structure;
reconstructing a previous version of the set of values after the second tree structure has been generated based on a pointer to the root chunk of the first tree structure.

* * * * *